(12) United States Patent
Bi et al.

(10) Patent No.: US 11,669,986 B2
(45) Date of Patent: Jun. 6, 2023

(54) GENERATING ENHANCED THREE-DIMENSIONAL OBJECT RECONSTRUCTION MODELS FROM SPARSE SET OF OBJECT IMAGES

(71) Applicant: ADOBE INC., San Jose, CA (US)

(72) Inventors: Sai Bi, La Jolla, CA (US); Zexiang Xu, San Jose, CA (US); Kalyan Krishna Sunkavalli, San Jose, CA (US); David Jay Kriegman, San Diego, CA (US); Ravi Ramamoorthi, Carlsbad, CA (US)

(73) Assignees: ADOBE INC., San Jose, CA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/233,122

(22) Filed: Apr. 16, 2021

(65) Prior Publication Data

US 2022/0343522 A1 Oct. 27, 2022

(51) Int. Cl.
*G06T 7/514* (2017.01)
*G06T 17/20* (2006.01)
(Continued)

(52) U.S. Cl.
CPC .............. *G06T 7/514* (2017.01); *G06T 17/20* (2013.01); *H04N 13/111* (2018.05);
(Continued)

(58) Field of Classification Search
None
See application file for complete search history.

(56) References Cited

U.S. PATENT DOCUMENTS

2012/0268571 A1* 10/2012 Debevec ................. G06T 7/586
348/48
2014/0035940 A1* 2/2014 Dmitriev ................. G06T 15/04
345/582

(Continued)

OTHER PUBLICATIONS

Xu et al., Deep View Synthesis from Sparse Photometric Images, Jul. 2019, ACM Trans. Graph., vol. 38, No. 4, Article 76 (Year: 2019).*

(Continued)

*Primary Examiner* — Anh-Tuan V Nguyen
(74) *Attorney, Agent, or Firm* — Shook, Hardy & Bacon L.L.P.

(57) ABSTRACT

Enhanced methods and systems for generating both a geometry model and an optical-reflectance model (an object reconstruction model) for a physical object, based on a sparse set of images of the object under a sparse set of viewpoints. The geometry model is a mesh model that includes a set of vertices representing the object's surface. The reflectance model is SVBRDF that is parameterized via multiple channels (e.g., diffuse albedo, surface-roughness, specular albedo, and surface-normals). For each vertex of the geometry model, the reflectance model includes a value for each of the multiple channels. The object reconstruction model is employed to render graphical representations of a virtualized object (a VO based on the physical object) within a computation-based (e.g., a virtual or immersive) environment. Via the reconstruction model, the VO may be rendered from arbitrary viewpoints and under arbitrary lighting conditions.

20 Claims, 7 Drawing Sheets

(51) Int. Cl.
  *H04N 13/111*  (2018.01)
  *H04N 13/282*  (2018.01)
  *H04N 13/128*  (2018.01)

(52) U.S. Cl.
  CPC ......... *H04N 13/128* (2018.05); *H04N 13/282* (2018.05); *G06T 2207/10012* (2013.01); *G06T 2207/10028* (2013.01)

(56) References Cited

U.S. PATENT DOCUMENTS

| | | | | |
|---|---|---|---|---|
| 2017/0124715 | A1* | 5/2017 | Tin | G06T 7/521 |
| 2017/0148222 | A1* | 5/2017 | Holzer | G06V 20/70 |
| 2018/0205941 | A1* | 7/2018 | Kopf | H04N 13/282 |
| 2018/0293711 | A1* | 10/2018 | Vogels | G06K 9/6256 |
| 2019/0347526 | A1* | 11/2019 | Sunkavalli | G06N 3/084 |
| 2021/0272359 | A1* | 9/2021 | Michielin | G06T 7/66 |
| 2021/0319538 | A1* | 10/2021 | Zhou | G06T 5/003 |
| 2021/0358211 | A1* | 11/2021 | Kim | G06T 7/90 |
| 2021/0390767 | A1* | 12/2021 | Johnson | G06V 40/176 |
| 2022/0051471 | A1* | 2/2022 | Logothetis | G06T 15/205 |

OTHER PUBLICATIONS

Li et al., "Free-viewpoint video relighting from multi-view sequence under general illumination," Machine vision and applications 25.7 (2014): 1737-1746 (Year: 2014).*

Bi, Sai, et al. "Deep 3d capture: Geometry and reflectance from sparse multi-view images." Proceedings of the IEEE/CVF Conference on Computer Vision and Pattern Recognition. 2020.

* cited by examiner

GENERATING ENHANCED THREE-DIMENSIONAL OBJECT RECONSTRUCTION MODELS FROM SPARSE SET OF OBJECT IMAGES

BACKGROUND

Three-dimensional (3D) geometry and optical-reflectance models are employed to render graphical representations of virtual objects within virtual environments, such as a conventional 2D display device and/or an immersive display device (e.g., a virtual-reality (VR) display, an augmented-reality (AR) display, and/or a mixed-reality (MR) display). In general, a geometry model encodes a representation of a geometry (e.g., the shape) of a two-dimensional (2D) manifold (e.g., a bounding surface) that characterizes the virtual object. For example, a geometry model may encode a discretized scalar field indicating a mesh model that includes a set of vertices representing a 3D "point cloud" for the object. That is, a geometry model encodes a discretization of the 2D manifold characterizing the object's surface. The geometry model may further encode a discretized vector field indicating the surface normal vectors for the discretized manifold. An optical-reflectance model (e.g., an optical reflectance model) encodes how light, incident on the object's surface, is reflected from the surface as a function of both the direction of incidence and the direction of reflection. Various reflectance models are also a function of the incident light's frequency. The virtual object's geometry and reflectance models are employed in combination to render a graphical representation (e.g., a reconstruction) of the virtual object on various display devices. Thus, the combination of a geometry model and a reflectance model may be referred to as a reconstruction model for the virtual object.

For many graphical applications, developers may wish to embed a virtualization of a physical object in a computation-based environment. For example, a developer may wish to embed a virtual object in an immersive environment, where the virtual object represents a 3D physical object, such as a statue. Importantly, the geometry and reflectance models for the virtual object should be robust in the sense that various applications require rendering a graphical representation of the physical object from arbitrary viewpoints, as well as under arbitrary lighting conditions (e.g., multiple non-point light sources positioned at multiple viewpoints with multiple frequency spectrums).

SUMMARY

The technology described herein is directed towards enhanced methods and systems for the generating an object reconstruction model. More particularly, the embodiments are directed towards generating both a geometry model and an optical-reflectance model (e.g., an object reconstruction model) for a physical object, based on a sparse set of images of the object under a sparse set of viewpoints and lighting conditions. The geometry model may be a mesh model that includes a set of vertices representing discretized regions on the object's surface. Thus, the geometry model encodes a representation of a geometry of the object's surface. The reflectance model may be a spatially-varying bidirectional reflectance distribution function (SVBRDF) that is parameterized via multiple channels (e.g., diffuse albedo, surface-roughness, specular albedo, and surface-normals). For each vertex of the geometry model, the reflectance model may include a value (e.g., a scalar, vector, or any other tensor value) for each of the multiple channels. The object reconstruction model may be employed to render graphical representations of a virtualized version of the physical object (e.g., a virtual object based on a physical object) within a computation-based (e.g., a virtual or immersive) environment. Thus, the reflectance model encodes a representation of one or more reflectance properties (e.g., diffuse albedo, surface-roughness, specular albedo, and/or surface-normals) of the object's surface. Via the reconstruction model, the virtual object (VO) may be rendered from arbitrary viewpoints and under arbitrary lighting conditions.

In the various embodiments, an arrangement of a limited set of cameras is configured to capture a limited set of input images of the object from a limited set of reference viewpoints. After input image acquisition, the set of images is processed in a two stage pipeline that generates the object construction model. In the first stage, by "fusing" or aggregating information encoded in the images across the multiple reference viewpoints, a multi-view geometry estimation neural network employs the set of input images to regress 2D depth maps for each reference viewpoint. Also in the first stage, a multi-view reflectance neural network employs the set of input images (and the 2D depth maps) to regress (again by aggregating information across the multiple reference viewpoints) estimations for the SVBRDF parameters for each reference viewpoint. The multi-view reflectance network also encodes latent features for each of the input images (which are features in the "learned" reflectance space of the network). Note that for this first stage, the regressed estimations for the surface-depths and reflectance parameters are per reference viewpoint (e.g., per-view estimates). These per-view (PV) estimates are employed as inputs to the pipeline's second stage. The PV latent features may be "composite" latent features, in that the latent features for a particular reference viewpoint are generated from a composite of the latent features for the input image (corresponding particular reference viewpoint) and the latent features for the other input images (corresponding to the other reference viewpoints).

During the second stage of the pipeline, a Poisson reconstruction engine generates a coarse geometry model that includes a set of vertices representing points of the object's surface. Sets of SVBRDF parameters are assigned to each vertex of the coarse geometry model, to generate a coarse reflectance model. The coarse geometry model may encode a coarse representation of the geometry of the bounding surface of the physical object. The coarse reflectance model encodes a coarse representation of one or more reflectance properties (e.g., diffuse albedo, surface-roughness, specular albedo, and/or surface-normals as encoded by the SVBRDF parameters) of the object's surface. The coarse geometry model and the coarse reflectance model are provided to a model optimizer. The model optimizer "fuses" the per-view SVBRDF parameters across the reference viewpoints (via per-vertex blending weights) to estimate a set of aggregated SVBRDF parameters for each vertex. The coarse geometry model and the aggregated SVBRDF parameters are employed to generate "synthetic" images corresponding to the input images. The composite latent features for the per-view synthetic images are determined and compared to the latent features of the input images. An error function is determined based on the comparison. The pipeline is differentiable such that the error function (based on a comparison between the synthetic images and the corresponding input images) may be backpropagated to iteratively and jointly update the vertices and the estimated SVBRDF parameters (based on decreasing the error function). After convergence, the model optimizer provides the refined geometry and reflectance models for the rendering of the VO based on the physical object from arbitrary viewpoints and lighting conditions. The refined geometry model encodes a refined representation of the geometry of the object's surface, while the refined reflectance model encodes a refined representation of the one or more surface reflectance properties of the object's surface.

DETAILED DESCRIPTION

Figure 1A:
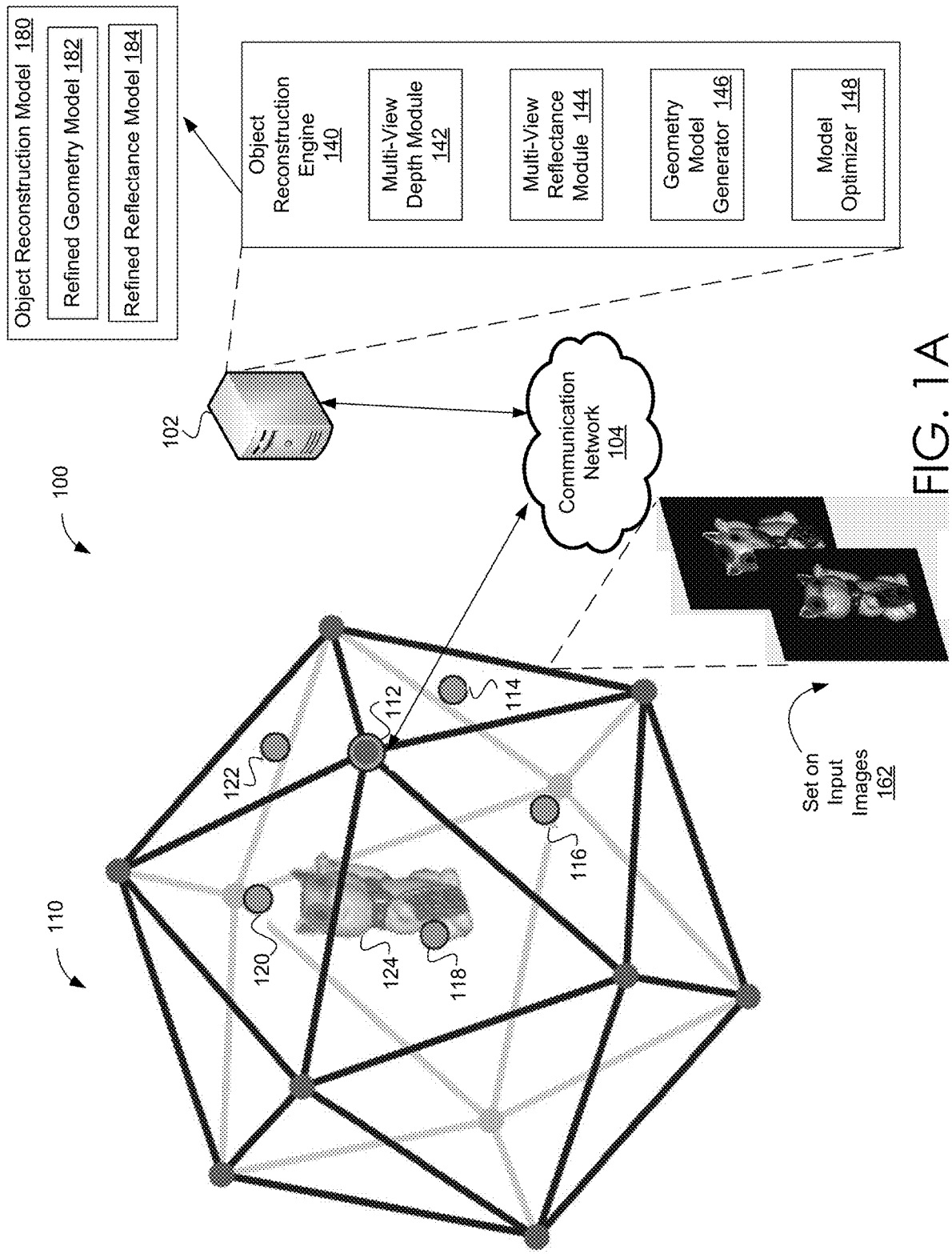
FIG. 1A illustrates an enhanced object reconstruction system implementing various embodiments presented herein.

The embodiments are directed towards generating enhanced three-dimensional (3D) geometry and reflectance models (e.g., an object reconstruction model) for a 3D physical object. The generation of the object reconstruction model (or simply the reconstruction model) is based on a sparse set of images of the physical object, where each input image is from a separate viewpoint. Thus, the 3D reconstruction model is generated from a sparse (or limited) set of viewpoints of the object. The object reconstruction model may be employed to render graphical representations of a virtualized version of the physical object (e.g., a virtual object based on a physical object) within a computation-based (e.g., a virtual or immersive) environment. Via the reconstruction model, the virtual object (VO) may be rendered on conventional two-dimensional (2D) display devices, virtual-reality (VR) display devices, augmented-reality (AR) display devices, mixed-reality (MR) display devices, and the like, from arbitrary viewpoints and under arbitrary lighting conditions.

Conventional attempts to generate reconstruction models for physical objects have employed complex image acquisition systems and/or multi-view stereo (MVS) methods. However, such conventional attempts have resulted in less-than-ideal object reconstructions and/or are limited to highly specific or restricted scenarios for image acquisition and object reconstruction. For example, some conventional methods have employed capturing extremely dense image sets of the objects under many different viewpoints and many different lighting conditions. These conventional methods often employ large arrays of cameras (e.g., complex configurations of tens or even hundreds of cameras) to capture image sets spanning a significant number of viewpoints and lighting conditions, e.g., image sets that densely cover the large space of possible viewpoints and lighting conditions. However, such dense image acquisition for a single physical object can be extremely complicated and cumbersome, as compared to the sparse image acquisition discussed herein. Considering that many applications require embedding significant numbers of physical objects (from many different viewing angles and lighting conditions), acquiring such dense image sets for such significant numbers of physical object may be impractical.

Other conventional object reconstruction methods have attempted to generate models from sparser image sets. However, these conventional sparse methods may be limited to reconstructing simple objects (e.g., object with mostly planar surfaces) from a very small set of viewpoints/lighting conditions that are adequately spanned by sparse image set. When these conventional methods are employed for complex objects (e.g., objects with surfaces of arbitrary shape and/or curvature) or in scenarios where the range of possible viewpoints/lighting conditions is expanded beyond those covered by the image set, the quality of the reconstruction suffers and may be insufficient for the application. For example, these conventional methods fail to adequately capture fine detail regarding the object's texture and reflectance properties.

To these ends, the embodiments are directed towards generating both a geometry model and an optical-reflectance model (e.g., an object reconstruction model) for a physical object, based on a sparse set of images of the object under a sparse set of viewpoints and lighting conditions. The sparse set of images is captured from a limited number of acquisition cameras that span a sparse set of reference viewpoints of the object. Furthermore, the bounding surface of the object to be reconstructed may have an arbitrary geometry and may include fine-grained texture. The object reconstruction model may be employed to render graphical representations of a virtualized version of the physical object (e.g., a virtual object based on a physical object) within a computation-based (e.g., a virtual or immersive) environment. Via the reconstruction model, the virtual object (VO) may be rendered from arbitrary viewpoints and under arbitrary lighting conditions. Furthermore, the arbitrary geometry and the fine-grained texture of the object is rendered with a significantly enhanced fidelity, as compared to conventional methods of object reconstruction.

At least some of the arbitrary viewpoints and arbitrary lighting conditions that a virtualized version of the object may be rendered at may not be explicitly represented in the sparse set of input images. That is, the enhanced geometry and reflectance models enable reconstructing graphical representations of the physical object from viewpoints and lighting conditions that are insufficiently represented in the sparse set of images that the models are based upon. A VO (corresponding to the physical object) may be fully embedded in a computing environment, such that the VO may be viewed from the arbitrary viewpoints and lighting conditions. In various embodiments, the geometry model of an object reconstruction model may be a mesh model that includes a set of vertices representing discretized regions on the object's bounding surface (e.g., a 2D manifold). The reflectance model for the object reconstruction model may be a bidirectional reflectance distribution function (BRDF) that includes multiple reflectance parameters for each vertex in the mesh model. Because the BRDF parameters may vary across object's 2D manifold, the BRDF model may be a spatially-varying BRDF (SVBRDF) model. In such embodiments, a SVBRDF model may include assigning a set of BRDF parameters to each vertex of the set of vertices of the geometry model. In at least one embodiment, the set of SVBRDF parameters assigned to each vertex may include a 4-tuple, with parameters corresponding to diffuse albedo, surface roughness, specular albedo, and surface-normals. Note that one or more of the four of the tuples may itself be a multi-valued, multi-component, or multi-parametrized object. For example, each of the diffuse albedo, specular albedo, and surface normal may be a 3D vector. Thus, to express the 4-tuple, 10 value, components, or parameters may be needed. Accordingly, as used herein, each tuple of a n-tuple may be scalar, vector, matrix, or tensor values. At least some of these parameters may be functions of angle of incidence and angle of reflection.

In the various embodiments, an arrangement of a limited set of cameras is configured to capture a limited set of images of the object from a limited set of viewpoints (e.g., a sparse set of input and/or reference viewpoints). The images of the physical object that are captured by the set of cameras may be referred to as input images because they serve as the initial inputs for generating the object reconstruction model. The set of viewpoints that the cameras view the object from may be referred to as the set of reference (or input) viewpoints. After input image acquisition, the set of images is processed in a two-stage pipeline that generates the object construction model. In the first stage, by "fusing" or aggregating information encoded in the images across the multiple reference viewpoints, a multi-view geometry estimation neural network employs the set of input images to regress 2D depth maps for each reference viewpoint. Also in the first stage, a multi-view reflectance neural network employs the set of input images (and the 2D depth maps) to regress (again by aggregating information across the multiple reference viewpoints) estimations for the SVBRDF parameters for each reference viewpoint. The multi-view reflectance network also encodes latent features for each of the input images (which are features in the "learned" reflectance space of the network). Note that for this first stage, the regressed estimations for the surface-depths and reflectance parameters is per reference viewpoint (e.g., per-view estimates). These per-view (PV) estimates are employed as inputs to the pipeline's second stage.

During the second stage, a Poisson reconstruction engine generates a coarse geometry model that includes a set of vertices representing points (or discretized regions) of the object's 2D manifold. Multiple sets of SVBRDF parameters (a single set may be a 4-tuples of SVBRDF parameters) are assigned to each vertex of the coarse geometry model, where each vertex is assigned a separate 4-tuple for each of the multiple reference viewpoints. The coarse geometry model may encode a coarse representation of the geometry of the bounding surface of the physical object. The coarse geometry model and the multiple sets of SVBRDF parameters are provided to a model optimizer. The model optimizer "fuses" the per-view SVBRDF parameters across the reference viewpoints (via per-vertex blending weights) to estimate a set of aggregated SVRDF parameters for each vertex. The coarse geometry model and the aggregated SVBRDF parameters are employed to generate "synthetic" images corresponding to the input images. The latent features for the per-view synthetic images are determined and compared to the latent features of the input images. An error (or loss) function is determined based on the comparison. The pipeline is differentiable such that the error function may be backpropagated to iteratively update the vertices and the estimated SVBRDF parameters (based on decreasing the error function). After convergence, the model optimizer provides the refined geometry and reflectance models.

In a non-limiting embodiment, the set of acquisition cameras includes six cameras. Other embodiments may include more of fewer cameras. However, in this non-limiting embodiment, the acquisition cameras and physical object (to be reconstructed via a virtual object) may be arranged via an icosahedronic arrangement as follows. The physical object is placed at the center of a regular icosahedron, comprised of 20 equilateral triangles forming 30 edges and 12 vertices. At each of the 12 vertices, five of the equilateral triangles meet to form the vertex. One of the six input cameras is positioned at a single vertex and each of the other five cameras is positioned at the centroid (e.g., the geometric center) of one of the vertex's five equilateral triangle faces. A separate lighting source may be co-positioned with each of the six cameras. The set of cameras and set of co-positioned lighting sources form a pentagonal pyramid (or a 60° triangular cone) about the physical object. A set of six input images of the physical object is captured, where each image is from the separate viewpoint of its corresponding camera. The single vertex that the single camera is positioned at may be referred to as the icosahedron's image vertex. The single camera (and light source) positioned at the image vertex may be referred to as the vertex camera (and vertex light source). The five other cameras (and light sources) may be referred to as face cameras because each one is positioned on a separate face and/or side (e.g., an equilateral triangle) of the icosahedron. Note that the icosahedronic arrangement employing six cameras is non-limiting, and other image capture geometries and other numbers of cameras may be utilized in other embodiments.

As noted above, when generating a reconstruction model for the physical object, the embodiments employ the set of input images in a two-stage pipeline that generates both the geometry and reflectance models for the object. In the first stage, surface-depth, surface-normals, and reflectance values are estimated for each reference viewpoint. In stage two, these per-view estimates are "fused" (e.g., aggregated) across the set of reference viewpoints to generate a geometry model and a reflectance model for the object. More specifically, in the first stage, the images (in one embodiment representing six separate reference views of the physical object) are employed to generate estimates for a 2D depth map, a surface-normal map, a latent features map, and a reflectance map for each input (or reference) viewpoint. At this stage, various information from each input image is aggregated (or pooled) across the sparse reference viewpoints to generate such estimations. In short, the depth, surface-normal, and reflectance for the portion of the object's surface that is imaged in each pixel for each image is estimated. Because these maps are specific to the reference viewpoint of an image, these mappings may be referred to as per-view (PV) mappings. In a PV map, the estimated values for depth, surface-normal, and reflectance are mapped to each pixel of each view. The particular viewpoint and the associated particular input image that correspond to a particular PV map may be referred to as the reference viewpoint and the reference image for the PV map respectively.

As used throughout, a "PV map" may be a data structure (e.g., a 2D array of scalar, vector, matrix, tensor, or other multi-valued quantities or objects). For some PV maps (e.g., PV depth maps, PV surface-normal maps, and PV reflectance maps), there may exist a one-to-one mapping between the elements of the PV map (e.g., the elements of a 2D array) and the pixels of the reference image. In such embodiments, each element of the 2D array corresponds to a pixel of an image from a reference viewpoint that corresponds to the PV map (e.g., the PV map's corresponding input image). For example, a particular PV depth map corresponding to a particular reference viewpoint of the six reference viewpoints may include a 2D array of scalar values indicating a distance between a camera and a point on a surface that is imaged by the camera. Each array element of the particular PV depth map corresponds to a pixel of the particular image captured at the particular reference viewpoint and is a scalar quantity encoding a spatial depth (from the corresponding camera's imaging plane) associated with the portion of the object's surface that is imaged by the corresponding pixel.

Likewise, a particular PV surface-normal map may be a 2D array (of 3D vector values) corresponding to the particular reference viewpoint. Each array element of the particular PV surface-normal map corresponds to a pixel of the particular image captured at the particular viewpoint and is a vector quantity encoding a vector (e.g., a unit vector) pointing in the direction that is normal (or substantially orthogonal) to the portion of the object's surface that is imaged by the corresponding pixel. A particular PV reflectance map may be a 2D array. Each array element of the particular PV reflectance map corresponds to a pixel of the particular image captured at the particular viewpoint and is a multi-valued quantity encoding an optical reflectance (e.g., a SVBRDF model) for the portion of the object's surface that is imaged by the corresponding pixel. For other PV maps (e.g., a PV feature map), the PV map may corresponds to a reference input viewpoint and reference input image; however there need not be a one-to-one correspondence between the elements of the PV map and the pixels of the reference image. Rather, a PV feature map may encode one or more latent features of the reference input image. Such latent features may be encoded in one or more vectors. Thus, a PV feature map for a particular reference viewpoint may include one or more vectors encoding latent features of the image captured at the particular reference viewpoint.

In the first stage of the two-stage pipeline, a PV depth map is estimated for each input view via a multi-view stereo network (e.g., a multi-view geometry estimation neural network). This set of PV depth maps is employed to "warp" each of the input images of the set input images to each of the other five reference viewpoints. Thus, each of the six reference viewpoints is associated with six images. Five of the six images associated with a particular reference viewpoint are warped images of the input images captured by the other cameras associated with the other five viewpoints, whereas the sixth image for the particular reference viewpoint is an un-warped image captured by the camera associated with the particular reference viewpoint. The set of six (one un-warped and five warped) images associated with a reference viewpoint may be referred to as a set of mapped images for the reference viewpoint because each of the images of the set of mapped to the reference viewpoint. The six mapped images for a reference viewpoint include the single input image captured by the camera that is positioned at the reference viewpoint. By virtue of the positioning of the camera that captured the image, this input image is mapped to the reference viewpoint. The six mapped images for the reference viewpoint additionally include five warped images that are mapped to the reference viewpoint via a warping of the other five input images captured by the other five cameras. Thus, six sets of mapped images (each set of mapped images including six images) are generated from the set of six input images. Each of the six sets of mapped images corresponds to one of the six reference viewpoints, resulting in $6^2=36$ mapped images (e.g., six un-warped images captured by the input cameras and 30 warped images based on warping the six input images to each of the other six reference viewpoints).

For each of the six reference viewpoints, each of the associated set of mapped images are employed as input images to a deep multi-view reflectance estimation network of the first stage of the pipeline. The output of the reflectance estimation network (for the particular set of mapped images associated with the particular reference viewpoint) includes a surface-normal map for the particular viewpoint and a set of estimated reflectance maps. The output of the multi-view reflectance estimation network may also include a set of PV feature maps, where each PV feature map of the set of PV feature maps corresponds to one of the reference viewpoints. Each of the PV feature maps may encode latent features of the image corresponding to the reference viewpoint, wherein the latent features are features encoded in vectors spanning the "deeply learned reflectance space" of the deep multi-view reflectance estimation network. These PV latent features maps may be a "fusion" or aggregation of multiple pairs of feature maps. These PV feature maps may be referred throughout as PV composite feature maps, or simply composite feature maps. In contrast to the other PV maps (e.g., PV depth maps, PV surface-normal maps, and PV reflectance maps), a particular PV feature map (corresponding to the particular input viewpoint and corresponding input image) need not include a one-to-one correspondence between the PV feature map's elements and the pixels of the corresponding reference image. Rather, the elements of a PV feature map may include a set of vectors (e.g., spanning the reflectance space of the multi-view reflectance estimation network) encoding latent features of the input image. In some embodiments, the PV depth maps are employed to generate the PV composite feature maps. The PV composite feature maps are employed to produce the PV reflectance maps.

The set of PV depth maps are employed to generate a set of PV surface-normal maps (e.g., a PV surface-normal map for each of the six viewpoints) and a set of PV reflectance maps (e.g., a PV reflectance map for each of the six viewpoints). At this first stage, the reflectance maps may be implemented via a simplified SVBRDF model that is parameterized by the surface reflectance properties: diffuse albedo, specular albedo, and roughness, as well as the surface-normals. Accordingly, a set of input images may be employed as inputs to the first stage. Based on the input set of images, the first stage generates a set of PV depth maps, a set of PV surface-normal maps, a set of PV reflectance maps, and a set of PV feature maps that are each employed as an input to the second stage.

In the second stage of the various embodiments, the per-view information included in the set of PV depth maps, the set of PV surface-normal maps, and the set of PV reflectance maps are "fused" (across the reference viewpoints) to generate a geometry model (e.g., a mesh model) and a reflectance model (e.g., a SVBRDF model) for a VO based on the physical object imaged in the set of input images. In some embodiments, after a generation of the geometry and reflectance models (i.e., the object's reconstruction model), the models are refined via an optimization process performed in a "reflectance space" that is "learned" via deep learning techniques. The set of PV feature maps may be employed in the model refinement and/or optimization process. More specifically, the set of PV depth maps and the set of PV surface-normal maps are employed as inputs to a Poisson reconstruction method that generates a mesh model. The mesh model includes a set of vertices. In some non-limiting embodiments, the mesh model may include a set of edges, where each edge connects two vertices from the set of vertices. The set of edges and the set of vertices form a set of polygons that approximates a geometry characterizing the object's 2D manifold (e.g., the bounding surface of the object). The reflectance model may include one or more reflectance parameters for each vertex of the geometry model's vertices.

Prior to the models' refinement process in the second stage, the geometry model may be referred to as a "coarse geometry model" or an "estimated geometry model." Likewise, the pre-refined reflectance model may be referred to as a "coarse reflectance model" or an "estimated reflectance model." The coarse reflectance model may include a set of estimated reflectance parameters for each vertex of the coarse geometry model's set of vertices and for each input viewpoint. The coarse reflectance model may encode a coarse representation of the reflectance properties (e.g., diffuse albedo, surface-roughness, specular albedo, and surface-normals) of the surface of the physical object. The reflectance parameters for each vertex and each reference view may additionally include a value corresponding to surface albedo, another value corresponding to surface roughness, another value corresponding to specular albedo, and still another value corresponding to a surface-normal. To refine the models, the set of estimated reflectance parameters for each vertex are "fused" (across the reference points) to reconstruct the object's geometry and reflectance (via a "synthetic" image). The set of PV features maps from the synthetic images are compared to the PV feature maps of the actual input images (e.g., ground-truth images). An error (or loss) function is defined via the comparison. The error function is backpropagated through the pipeline to iteratively refine the geometry and reflectance models, e.g., the error function is iteratively minimized (or at least decreased) through backpropagation methods. More particularly, the set of PV feature maps are employed as inputs to a reflectance decoder network (similar to a reflectance decoder network employed in the multi-view reflectance estimation network of the first stage of the pipeline) to generate a set of SVBRDF parameters via per-vertex blending weights. The aggregated SVBRDF parameters are employed to generate "synthetic" images. As error (or loss) function is determined via a comparison between the synthetic and input images. The error function is back-propagated through the network and the sets of PV BRDF and the vertex blending weights are iteratively updated until the error function converges to an acceptably small value. The converged network is employed to generate the final geometry and reflectance models.

Example Operating Environment and Pipeline

FIG. 1A illustrates an enhanced object reconstruction system 100 implementing various embodiments presented herein. Reconstruction system 100 is enabled to generate an object reconstruction model 180 (e.g., a refined geometry model 182 and a refined reflectance model 184) for a virtual object (VO) based on a tangible physical three-dimensional (3D) object (e.g., a "beckoning cat statue" 124). Reconstruction system 100 may include at least one computing device (e.g., server computing device 102) and an image acquisition sub-system 110 that are communicatively coupled via communication network 104. The server computing device 102 implements an object reconstruction engine 140. The object reconstruction system 140 is enabled to generate the object reconstruction model 180 based on a set of input images 162 of the physical object 124. The image acquisition system (or sub-system) 110 includes a set of acquisition camera devices that capture the set of images of the physical object 124 from a sparse set of reference viewpoints. The set of acquisition cameras acquire a set of images 162 of the 3D physical object 124 to be reconstructed via a VO. The set of acquired images 162 are provided to the object reconstruction engine 140 via the communication network 104.

In the non-limiting embodiments of FIG. 1A, the image acquisition system 110 includes a set of six acquisition cameras (and corresponding light sources) labeled as: camera 112, camera 114, camera 116, camera 118, camera 120, and camera 122. Each of the cameras of the set of acquisition cameras is communicatively coupled to server computing device 102, via communication network 104. In some embodiments, a mesh communication network may be configured for the cameras, and only a single camera (e.g., camera 112) need be communicatively coupled to the communication network 104. In such embodiments, each of the other camera (e.g., cameras 114, 116, 118, 120, and 122) may be indirectly coupled to the communication network 104 via the mesh network and the single camera directly coupled to communication network 104. In other embodiments, each of the acquisition cameras may be directly coupled to the communication network 104.

The set of six acquisition cameras may be arranged via an icosahedronic arrangement. It should noted that an icosahedronic configuration of six acquisition cameras is non-limiting, and other embodiments may include fewer or more cameras arranged in alternative geometries. As shown in FIG. 1, the physical object 124 to be reconstructed via a VO is placed at the center of a regular icosahedron, comprised of 20 equilateral triangles forming 30 edges and 12 vertices. At each of the 12 vertices, five of the equilateral triangles meet to form the vertex. One of the six cameras (vertex camera 112) is positioned at a single vertex and each of the other five cameras (e.g., face cameras 114, 116, 118, 120, and 122) is positioned at the centroid (e.g., the geometric center) of one of the vertex's five equilateral triangle faces. A separate lighting source may be co-positioned with each of the six cameras. The set of acquisition cameras and set of co-positioned lighting sources form a pentagonal pyramid (or a 60° triangular cone) about the physical object 124. A set of six images of the physical object 124 is captured, where each image is from the separate reference viewpoint of its corresponding camera. Note that the angle between the vertex camera 112 and each of the five face cameras is approximately 37°.

A set of input images 162 of the physical object 124 is acquired, where each image in the set of input images 162 is acquired by a separate camera of the set of acquisition cameras. In some embodiments, during the acquisition of each image of the set of input images 162, the physical object 124 is illuminated only by the light source that is co-located with the acquiring camera. Thus, the six input images 162 are acquired in a temporal sequence, and under separate lighting conditions. The set of input images 162 may be referenced as: $\{I_i\}_{i=1}^n$, where n=6 and the index i refers to the camera (and corresponding reference viewpoint) that captured the image. As noted above, the embodiments are not so limited and the value of n in other embodiments may be less than or greater than 6.

Once acquired, the set of images 162 are provided to the object reconstruction engine 140 to generate an object reconstruction model 180 for the physical object 124. As noted above, the outputted objected reconstruction model 180 includes a refined geometry model 182 and a refined reflectance model 182. The object reconstruction engine 140 may include a multi-view depth module 142, a multi-view reflectance module 144, a geometry model generator 146, and a model optimizer 148. Implementation details and the functionality of the various components of the object reconstruction engine 140 are discussed at least in conjunction with pipeline 150 of FIG. 1B. However, briefly here, multi-view depth module 142 is generally responsible for determining a depth map for each of the input images of the set of input images 162. Because a depth map is generated for each of the reference viewpoints, a single depth map may be referred to as a per view (PV) depth map for a particular reference viewpoint. Thus, multi-view depth module 142 may generate a set of PV depth maps based on the set of input images 162, where each PV depth map of the set corresponds to a separate reference viewpoint. The multi-view reflectance module 144 is generally responsible for generating a set of PV reflectance maps. The geometry model generator 146 is generally responsible for employing the set of PV depth maps and the set of PV reflectance maps to generate a coarse geometry model (e.g., a mesh model) for the physical object 124. In some embodiments, one or more reflectance parameters may be generated for each vertex of the geometry's mesh model. These reflectance parameters may serve as a coarse reflectance model for the physical object 124. Model optimizer 148 is generally responsible for iteratively refining/updating the coarse geometry and coarse reflectance models to generate the refined geometry model 182 and the refined reflectance model 184 for the physical object 124.

Communication network 104 may be a general or specific communication network and may directly and/or indirectly communicatively coupled to server computing device 102 and each of the input cameras of the image acquisition system 110. Communication network 104 may be any communication network, including virtually any wired and/or wireless communication technologies, wired and/or wireless communication protocols, and the like. Communication network 104 may be virtually any communication network that communicatively couples a plurality of computing devices and storage devices in such a way as to computing devices to exchange information via communication network 104.

Figure 1B:
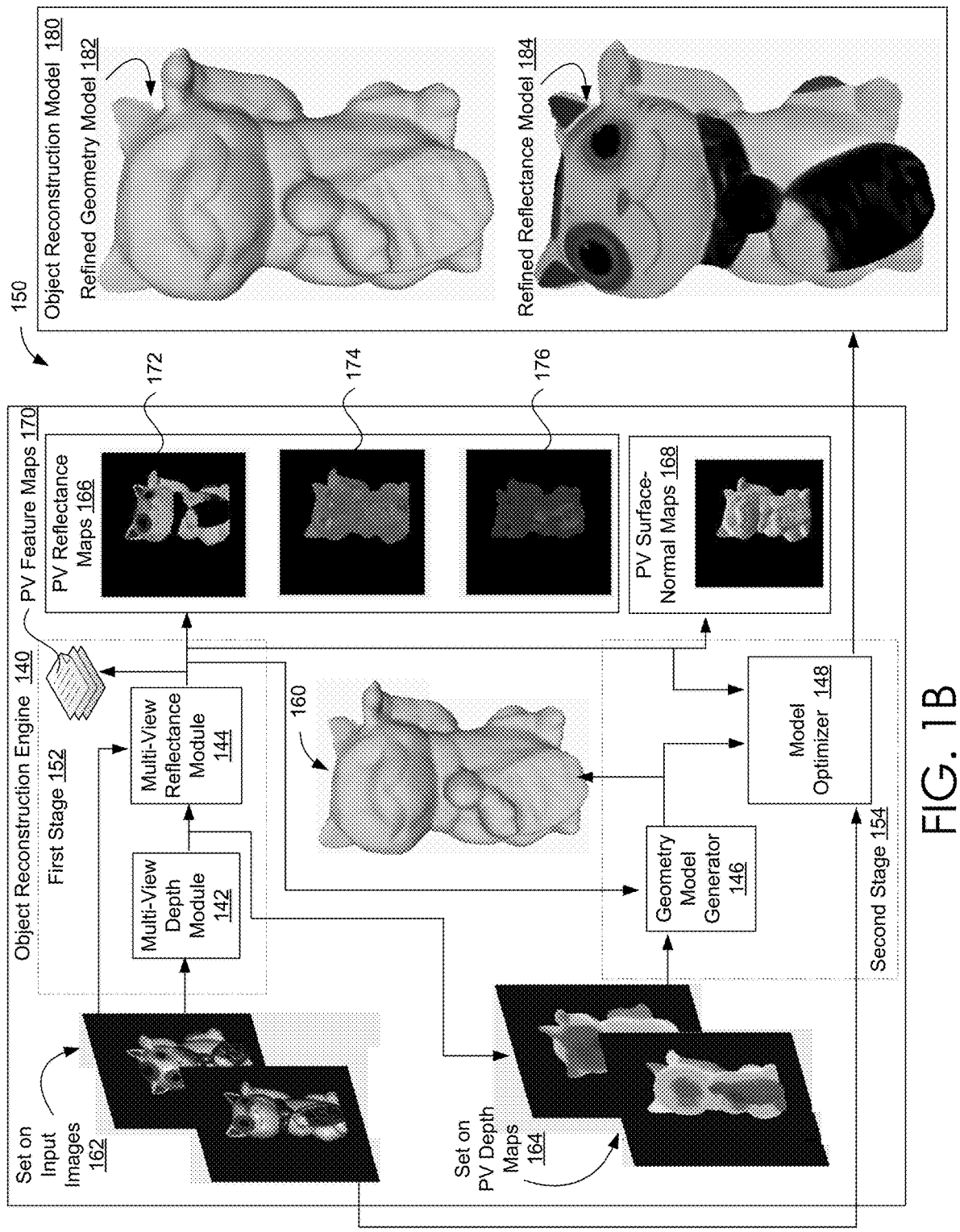
FIG. 1B illustrates a pipeline for the object reconstruction system of FIG. 1A, according to various embodiments presented herein.

FIG. 1B illustrates pipeline 150 for the object reconstruction engine 140 of FIG. 1A, according to various embodiments presented herein. Pipeline 150 includes two stages: a first stage 152 and a second stage 154, that include separate operations/functionality of the object reconstruction engine 140. The first stage 152 generally includes the operations/functionality of the multi-view depth module 142 and the multi-view reflectance module 144 of the object reconstruction engine 140. The second stage 154 generally includes the operations/functionality of the geometry model generator 146 and the model optimizer 148 of the object reconstruction engine 140.

Pipeline 150 begins with the acquisition of a set of input images 162. The set of images 162 may be acquired via image acquisition system 110 of FIG. 1A (or another image acquisition system with fewer or more input cameras arranged in a similar or an alternative geometrical configuration to the icosahedron arrangement of image acquisition system 110). As discussed above, the set of images 162 may be referenced via the set notation: $\{I_i\}_{i=1}^n$, where n=6 and the index i refers to the camera (and corresponding reference viewpoint) that captured the image. Each of the input images may be a 2D image of a 3D physical object (e.g., a beckoning cat statue 124 of FIG. 1A) captured from a separate reference viewpoint. Each input image of the set of input images 162 may include a set of pixels, with pixel values encoded in a 2D array. In the first stage 152 of pipeline 150, the set of input images 162 is provided as input to the multi-view depth module 142. Various embodiments of the multi-view depth module 142 are discussed at least in conjunction with FIG. 2. However, briefly here, the multi-view depth module 142 includes a deep multi-view geometry estimation network that receives the set of images 162 as input and generates a set of per view (PV) depth maps 164. Each PV depth map of the set of PV depth maps 164 corresponds to one of the reference viewpoints of the set of input images 162. A particular PV depth map (corresponding to a particular input image captured from a particular reference viewpoint) may be a pixelated image, where each pixel of the PV depth map corresponds to a pixel of the corresponding particular input image and the value of the pixel corresponds to a depth of the physical object being imaged in the corresponding pixel of the corresponding particular input image. Each of the PV depth maps may be stored as a 2D arrays of pixel scalar values. The set of PV depth maps 164 may be referenced via the set notation: $\{D_i\}_{i=1}^n$, where n=6 and the index i refers to the camera (and corresponding reference viewpoint) that captured the corresponding image.

The set of input images 162, as well as the set of PV depth maps 164 are employed as input to the multi-view reflectance module 144 in the first state 152 of pipeline 150. Various embodiments of the multi-view depth module are discussed at least in conjunction with FIG. 3. However, briefly here, the multi-view reflectance module 144 includes a deep multi-view reflectance estimation network that receives the set of images 162 as input and generates a set of PV reflectance maps 166, a set of PV surface-normal maps 168, and a set of PV feature maps 170. Similar to PV depth maps, each of the PV reflectance maps, each of the PV surface-normal maps, and each of the PV feature maps of the respective sets 166/168/170 may correspond to one of the input images (and the corresponding reference viewpoint). Furthermore, the PV reflectance maps 166 and the PV surface-normal maps 168 may be stored as 2D arrays of pixels corresponding to the pixels of the corresponding input images. The pixel values of a PV surface-normal map may correspond to a 3D vector that is normal (e.g., substantially orthogonal) to the physical object's 124 surface element that is imaged in the corresponding pixel of the corresponding input image.

At this first stage 152, the PV reflectance maps may be implemented via a simplified BRDF model that is parameterized by the surface reflectance properties: diffuse albedo, specular albedo, and roughness. Thus, a particular PV reflectance map corresponding to a particular input image (and the corresponding reference viewpoint) may include three reflectance channels (and thus three separate image maps). Each of the three channels may correspond to a separate reflectance parameter: diffuse albedo, specular albedo, and surface roughness. Thus, the particular PV reflectance map 166 for a particular reference view includes three separate images (or 2D arrays) encoding values for reflectance parameters: a PV diffuse albedo map 172, a PV surface roughness map 174, and a PV specular albedo map 176. Because the PV surface-normal maps 168 indicate a direction that is substantially orthogonal to the object's light-reflecting surface, the combination of the set of PV reflectance maps 166 and the set of PV surface-normal maps 168 may be referred to as a coarse PV reflectance model (e.g., a SVBRDF model), with four channels. Because in the first stage 152 of pipeline 150, each viewpoint of the reference viewpoints has its own set of values for the four-channel BRDF model, the estimated reflectance model may be referred to as a spatially-varying BRDF (SVBRDF) reflectance model.

Figure 3:
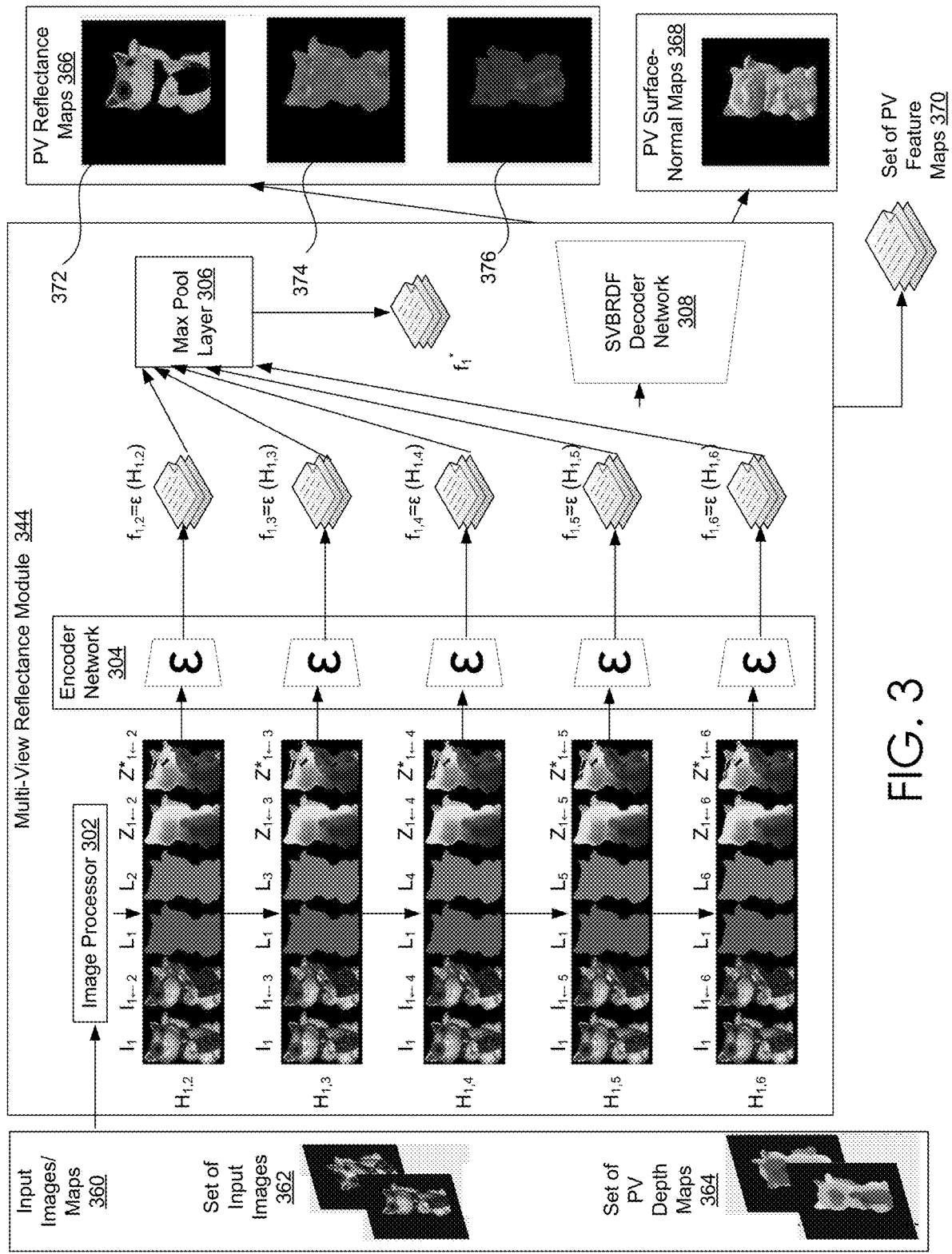
FIG. 3 illustrates a non-limiting embodiment of a multi-view reflectance module included in the object reconstruction engine of FIGS. 1A-1B, according to various embodiments presented herein.

Each of the PV feature maps of the set of PV feature maps 170 may encode latent features of the corresponding input (or reference) image, wherein the latent features are features in the "deeply learned reflectance space" of the deep multi-view reflectance estimation network of the multi-view reflectance module 144. As shown in FIG. 3, these PV feature maps 170 are aggregated or pooled from multiple pairs of feature maps. Thus, PV feature maps 170 may be referred to as PV composite feature maps, or simply composite feature maps. In contrast to the other PV maps (e.g., PV depth maps, PV surface-normal maps, and PV reflectance maps), a particular PV feature map (corresponding to the particular input viewpoint and corresponding input image) need not include a one-to-one correspondence between the PV feature map's elements and the pixels of the corresponding reference image. Rather, the elements of a PV feature map may encode latent features of the reference image.

The set of input images 162, the set of PV depth maps 164, the set of PV reflectance maps 166, the set of PV surface-normal maps 168, and the set of PV feature maps 170 are provided as inputs to the second stage 152 of pipeline 150. More specifically, in stage two 154, the set of PV depth maps 164 and the set of PV surface-normal maps 168 are provided as inputs to the geometry model generator 146 of the object reconstruction engine 140. Geometry model generator 146 fuses the PV values of the depth maps and surface normal across the set of reference viewpoints to generate a single 3D geometry model for the physical object 124. The geometry model generated by the geometry model generator 146 may be a coarse geometry model for the physical object. The coarse geometry model may include a mesh model generated via a Poisson reconstruction method based on fusing the depth and surface-normal values across the reference viewpoints. The mesh model includes a set of vertices and a set of edges, where each edge connects two vertices from the set of vertices. The set of edges and the set of vertices form a set of polygons that approximates a coarse geometry characterizing the object's 2D manifold (e.g., the bounding surface of the object 124). The coarse geometry model 160 enables a rendering of a coarse approximation of the object's 2D manifold. That is, the coarse geometry model 160 encodes a coarse representation of a geometry of the surface of the physical object.

The coarse geometry model 160, the set of input images 162, the set of PV feature maps 170, and the SVBRDF model (e.g., the set of reflectance maps 166 and the set of surface-normal maps 168) are provided as inputs to the model optimizer 148. The SVBRDF parameters may be referred to as a coarse reflectance model (e.g., a coarse SVBRDF model). The coarse geometry model encodes a coarse representation of the geometry of the surface of the object. The coarse reflectance model may encode a coarse representation of one or more reflectance properties (e.g., diffuse albedo, surface-roughness, specular albedo, and/or surface-normals). The model optimizer 148 operates to iteratively and jointly optimize (or at least refine) the coarse geometry and reflectance models and generate an object reconstruction model 180 for the physical object 124. The object reconstruction model 180 includes a refined geometry model 182 and a refined reflectance model 184. The coarse models are refined via an optimization process, as implemented by model optimizer 148 and performed in a "reflectance space" that is "learned" via deep learning techniques. As noted throughout, the coarse geometry model 160 may be a mesh model that includes a set of vertices. Each vertex of the set of vertices represents a point (or a discretized region) of the 2D manifold characterizing the bounding surface of the physical object 124.

The model optimizer 148 may begin an iteration of the model optimization process by fusing (or aggregating) the set of PV reflectance maps 166 and the set of PV surface-normal maps 168 (across the reference viewpoints). The coarse reflectance model may include a set of estimated reflectance parameters for each vertex of the coarse geometry model's set of vertices and for each input viewpoint. To refine the coarse models, the set of estimated reflectance parameters for each vertex are "fused" to reconstruct the object's geometry and reflectance and the set of PV features maps are optimized. More particularly, the set of PV composite features maps 170 are employed as inputs to a reflectance decoder network (implemented by model optimizer 148) that generates a set of "blended" or aggregated SVBRDF parameters (e.g., from the set of PV reflectance maps 166) for each of the reference viewpoints and per-vertex blending weights. Because the set of SVBRDF parameters model the surface's reflections from multiple viewpoints (e.g., the set of reference viewpoints), the set of SVBRDF parameters may be referred to as a per-view SVBRDF model. The sets of PV SVBRDF parameters are "fused" via the vertex blending weights. The sets of PV BRDF and the sets of PV feature maps are employed to render an artificial image of each of the input images. An error function is calculated via a comparison between the corresponding artificial and input images. The error function is back-propagated through the network and the sets of PV BRDDF and the vertex blending weights are iteratively updated until the error function converges to an acceptably small value.

Figure 2:
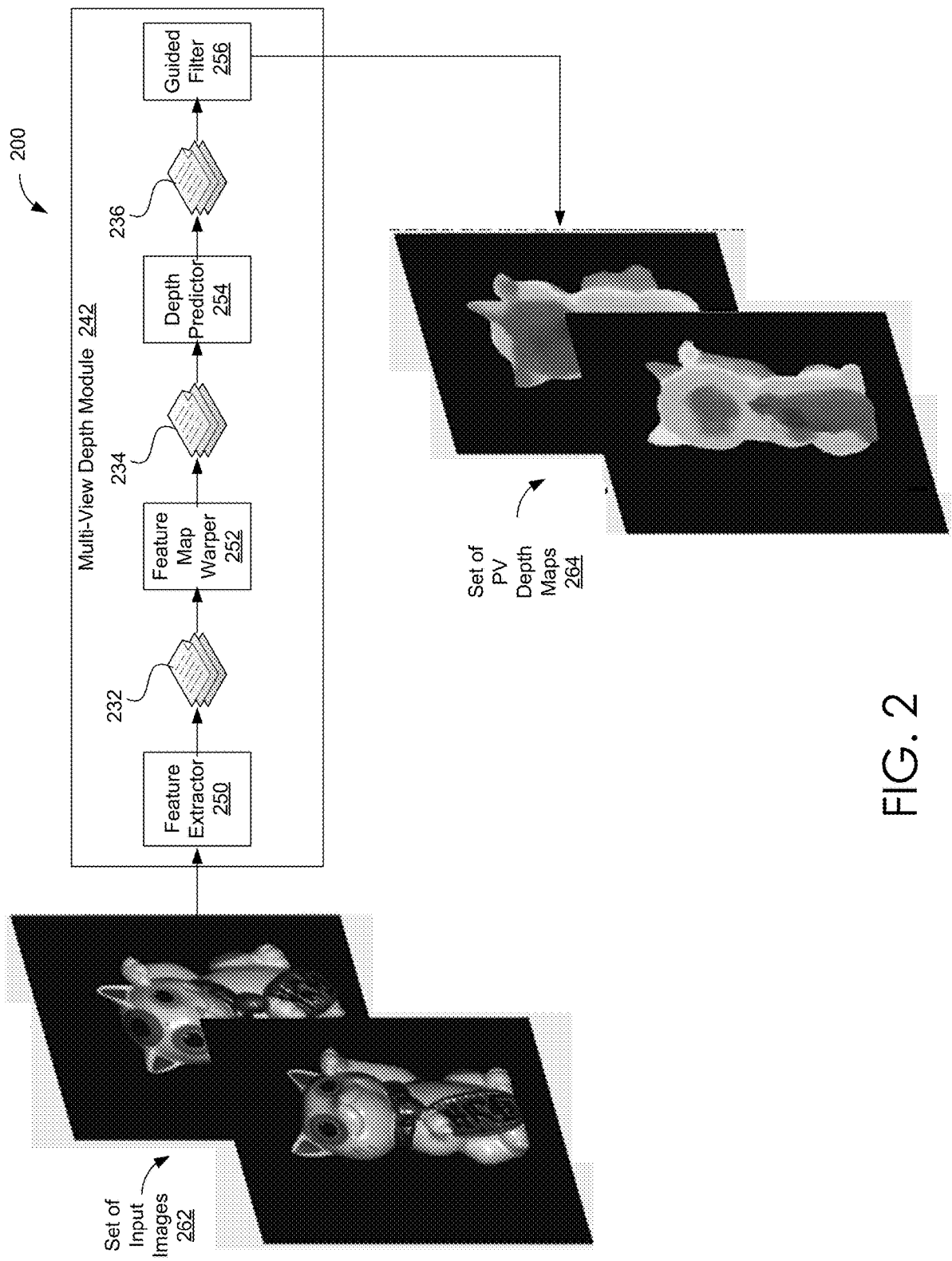
FIG. 2 illustrates a non-limiting embodiment of a multi-view depth module included in the object reconstruction engine of FIGS. 1A-1B, according to various embodiments presented herein.

FIG. 2 illustrates a non-limiting embodiment of a multi-view depth module 242 included in the object reconstruction engine 140 of FIGS. 1A-1B, according to various embodiments presented herein. Multi-view depth module 142 of object reconstruction engine 140 may include features and/or functionalities that are equivalent or similar to multi-view depth module 242. Similar to multi-view depth module 142, multi-view depth module 242 receives a set of input images 262 and outputs a set of PV depth maps 264. The set of input images 262 may be similar to the set of input images 162 of FIGS. 1A-1B, and the set of PV depth maps 264 may be similar to the set of PV depth maps 164 of FIG. 1A. The multi-view depth module 242 may include a feature extractor 250, a feature map warper 252, a depth predictor 254, and a guided filter 256. The combination of the components of the multi-view depth module 242 may be referred to as a multi-view geometry estimation network.

The feature extractor 250 may include a feature extractor neural network, referenced as F. The feature extractor 250 may be implemented via a 2D convolutional neural network, such as but not limited to a 2D U-Net. The feature extractor 250 receives the set of input images 262 and generates a set of feature maps 232. Each feature map of the set of feature maps 232 corresponds to a particular input image of the set of input images 262 and may be a 16-channel feature map for the particular input image. The set of feature maps 232 are provided to the feature map warper 252, which "warps" each feature map to each of the other five reference viewpoints. The feature map warper 252 may implement a set of pre-defined depth levels (e.g., a 7 bit value for 128 discreet depth levels) to build a 3D plane sweep volume by calculating the variance of the feature maps of the set of reference views. The resulting set of warped feature maps 234 encode the 3D plane sweep volumes and are provided to the depth predictor 254. The set of warped feature maps 234 may include six separate sets of PV feature maps, each of the six sets corresponding to one of the six reference viewpoints. Each of the six separate sets of PV feature maps may include six PV feature maps (one un-warped feature map from the set of feature maps 232 and five warped feature maps from the set of feature maps 232 that are warped to the corresponding reference viewpoint), forming a set of 36 feature maps.

The depth predictor 254 may include a correspondence predictor neural network, referenced as C. The depth predictor 254 may be implemented via a 3D convolutional neural network, such as but not limited to a 3D U-Net. The depth predictor 254 generally predicts a probability for each pre-defined depth level for each input image, based on the corresponding set of feature maps of the set of warped feature maps 234. The depth (for each pixel) is calculated as a probability-weighted sum of the depth levels across the set of warped images corresponding to the reference viewpoint. The depth predictor 254 outputs a set of coarse depth maps 236, which includes a coarse PV depth map for each of the reference viewpoints. The set of coarse depth maps 236 may be referenced via the set notation: $\{D'\}_{i=1}^{n}$, where n=6 and the index i refers to the camera (and corresponding reference viewpoint) that captured the corresponding image. The training loss function (e.g., $L_l$ referring to the least absolute deviations loss function) for the depth predictor 254 may be defined between the predicted depths and the ground truth depths.

The depth of a surface may be more challenging to estimate for regions of the surface that are relatively textureless, e.g., regions that lack sufficient texture. The inclusion of a guided filter 256 in the multi-view depth module 242 may increase the accuracy of the set of coarse depth maps 236, at least for textureless regions of the physical object. The set of coarse depth maps 236 are provided to the guided filter 256. The guided filter 256 may include a neural network, which includes a guided map extractor (referenced as G) and a guided layer (referenced as g). The guided filter 256 transforms the set of coarse depth maps 236 into the outputted set of PV depth maps 264 via the operations of the guided map extractor and the guided layer. As noted throughout, the set of PV depth maps 264 may be referenced via the set notation: $\{D\}_{i=1}^{n}$, where n=6 and the index i refers to the camera (and corresponding reference viewpoint) that captured the corresponding image. The transformation of the set of coarse depth maps 236 to the set of PV depth maps 264 may be accomplished via the guided filter 256 operations: $D_1 = g(G(I_i), D_i')$, where $I_i$ indicates the corresponding image in the set of input images 162. The components of the multi-view depth module 242 may be jointly trained in an end-to-end manner, via the loss function $L_l$.

FIG. 3 illustrates a non-limiting embodiment of a multi-view reflectance module 344 included in the object reconstruction engine 140 of FIGS. 1A-1B, according to various embodiments presented herein. Multi-view reflectance module 144 of object reconstruction engine 140 may include features and/or functionalities that are equivalent or similar to multi-view reflectance module 344. The input images/maps 360 for the multi-view reflectance module 344 includes the set of input images 362 and the set of PV depth maps 364 (e.g., generated as output of the milt-view depth module 242 of FIG. 2). Thus, similar to multi-view reflectance module 144, multi-view reflectance module 344 receives the set of input images 362 and the set of PV depth maps 364 and outputs a set of PV reflectance maps 366, a set of PV surface-normal maps 368, and a set of PV feature maps 370. The set of input images 362 may be similar to the set of input images 162 of FIGS. 1A-1B, and the set of PV depth maps 364 may be similar to the set of PV depth maps 164 of FIG. 1A. The set of PV reflectance maps 366 may be similar to the set of PV reflectance maps 166 of FIG. 1B, and the set of PV surface-normal maps 368 may be similar to the set of PV surface-normal maps 168 of FIG. 1B. As such, the set of PV reflectance maps 366 may include three separate images (or 2D arrays) encoding values for reflectance parameters: a PV diffuse albedo map 372, a PV surface roughness map 374, and a PV specular albedo map 376. Because the PV surface-normal maps 368 indicate a direction that is substantially orthogonal to the object's light-reflecting surface, the combination of the set of PV reflectance maps 366 and the set of PV surface-normal maps 368 may be referred to as a coarse PV reflectance model (e.g., a BRDF model), with four channels. This estimated coarse reflectance model may be referred to as a single-view BRDF (SVBRDF) reflectance model. The coarse reflectance model may encode a coarse representation of one or more reflectance properties (e.g., diffuse albedo, surface-roughness, specular albedo, and/or surface-normals) of the surface of the physical object.

The multi-view depth module 344 may include an image processor 302, an encoder network 304, a max pool layer 306, and a SVBRDF decoder network 308. The combination of the neural networks: encoder network 304, max pool layer 306, and the SVBRDF 308 may be referred to as a multi-view reflectance estimation network because it is employed to estimate a coarse SVBRDF model for each of the reference viewpoints. The encoder network layer 304 processes pairs of inputs (each pair of inputs is based on a pairing of reference viewpoints). In the non-limiting embodiment employing six reference viewpoints, each of the six viewpoints may be paired with the five other viewpoints, resulting in 30 possible pairings of reference viewpoints. FIG. 3 demonstrates the processing of a particular reference viewpoint, e.g., reference viewpoint 1. In FIG. 3, reference viewpoint 1 is paired with the other five reference viewpoints, resulting in five of the possible 30 pairings of reference viewpoints. For clarity, the processing of the other 25 possible reference viewpoint pairings is not shown in FIG. 3. The encoder network layer 304 may include five encoder neural networks ($\epsilon$) arranged in parallel to process the five pairings. In this embodiment, shown in FIG. 3, the other five reference viewpoints may be processed serially with the processing of reference viewpoint 1. In other embodiments, the encoder network layer 304 may include 30 encoder neural networks (also including five separate max pool layers and five separate SVBRDF decoder networks) to process the 30 pairings in parallel. In at least one embodiment, the encoder network layer 304 may include a single encoder neural network, and each of the 30 pairings may be processed in parallel.

The input to an encoder neural network (e.g., $\epsilon$ which processes a single pairing of reference viewpoints) include six images (and/or PV maps) corresponding to the pairings of reference viewpoints based on the input images/maps 360. Image processor 302 processes the input images/maps 360 for inputting into the encoder network layer 304. Image processor 302 may warp each input image (captured at a particular reference point) to each of the other five reference viewpoints, resulting in a set of warped images. The set of warped images includes 30 warped images, each warped to a reference viewpoint that is separate from the reference viewpoint the input image was captured from. The individual warped images may be referenced as: $\{I_{i \leftarrow j}\}$. The index j refers to the reference viewpoint that the warped image was originally captured from, and the index i refers to the reference viewpoint that the image is warped to, where $i \neq j \in \{1,2,3,4,5,6\}$. The set of PV depth maps 364 are employed to perform the warpings of the set of input images 362. To handle occlusions of the object from various reference viewpoints, the set of PV depth maps 364 are employed to directly locate occluded regions of the object's surface. The "empty pixels" corresponding to occluded regions are kept within the warped images, allowing the encoder networks to "learn" which regions are occluded via a comparison between the unwarped image and the five warped images corresponding to the reference viewpoint.

For a set of inputs for a pair of reference viewpoints to an encoder neural network, two separate "warped" PV depth maps are included. For each pixel in a first warped PV depth map, the depths are calculated from the warped image $I_{i \leftarrow j}$ to generate a first warped depth map: $Z_{i \leftarrow j}$. A second warped OV depth map $Z_{i \leftarrow j}^*$ is calculated by the image processor 302, by projecting the un-warped PV depth map $D_j$ onto reference viewpoint i. At the pixel level, the pixels of $Z_{i \leftarrow j}$ are compared to the corresponding pixels of $Z_{i \leftarrow j}^*$. If a pixel depth value of $Z_{i \leftarrow j}$ is larger than the correspond pixel depth value of $Z_{i \leftarrow j}^*$, then the pixel may be occluded in reference viewpoint j, otherwise the pixel does not correspond to an occluded region. The lighting directions of each of the paired reference viewpoints are also included in the inputs to the encode neural network: $L_i$ and $L_{i \leftarrow j}$. To determine the lighting directions of the reference viewpoints, the light sources (co-located with the input cameras) are assumed as point light sources. The calculated lighting directions are encoded in the coordinate system of the reference viewpoint (e.g., reference viewpoint i).

The set of inputs, for a pair of reference viewpoints i and j (where the reference viewpoint i is the un-warped reference viewpoint and the reference viewpoint j is the warped reference viewpoint) may be referenced by the 6-tuple: $H_{i,j} = \{I_i, I_{i \leftarrow j}, Z_{i \leftarrow j}, Z_{i \leftarrow j}^*, L_i, L_{i \leftarrow j}\}$. Each encoder network ($\epsilon$) may include 14 channels, e.g., three color channels for each of the two input images (totaling six color channels), three spatial direction channels for each of the two lighting direction maps (total six direction channels), and one depth channel for each of the two depth maps (totaling two depth channels). The five inputs to the encoder neural networks result in five outputs, which are intermediate PV feature maps (e.g., maps of intermediate latent features): $f_{i,j} = \epsilon(H_{i,j})$. The max-pool layer 306 aggregates the intermediate feature maps ($f_{i=1,j}$) across the five pairings for the un-warped reference viewpoint (e.g., i=1) to generate a common feature map for the view: $f_i^* = \text{max-pool}(\{f_{i,j}\}_{j=1}^6)$, where $j \neq i$ in the summation over the index j. A set of PV feature maps 370 (one feature map for each of the six reference viewpoints) is generated. Because the PV feature maps in the set of PV feature maps 170 are an aggregation of the pairs of PV feature maps (pooled by max pool layer 306) corresponding to a reference viewpoint, these PV feature maps may be referred to as PV composite feature maps, or simply composite feature maps. Likewise, the set of PV feature maps 370 may be referred to as a set of PV composite feature maps 370, or simply set of composite feature maps 370. Note that each composite feature map of the set of composite feature maps 370 is based on a composite of the set of input images 362 warped to the corresponding viewpoint of the set of viewpoints.

Each of the PV feature maps is provided to the SVBRDF decoder network 308, referenced by $\mathcal{D}$. The SVBRDF decoder network 308 generates the 4-tuple (for each reference viewpoint): $\mathcal{D}(f_i^*) = (A_i, N_i, R_i, S_i)$, where $A_i$ corresponds to PV diffuse albedo map 372, $N_i$ corresponds to PV surface-normal map 368, $R_i$ corresponds to PV surface roughness map 374, and $S_i$ corresponds to PV specular albedo map 376. The set of 4-tuples resulting generated by the SVBRDF decoder network 308 (a 4-tuple corresponding to each of the reference viewpoints) may be referred to as the set of decoded feature maps, and includes the set of RV reflectance maps 366 and the set of PV surface-normal maps 368. A training loss function for the multi-view reflectance estimation network may be constructed as: $\mathcal{L} = \mathcal{L}_A + \mathcal{L}_N + \mathcal{L}_R + \mathcal{L}_S + \mathcal{L}_I$. The first four terms ($\mathcal{L}_A + \mathcal{L}_N + \mathcal{L}_R + \mathcal{L}_S$) may represent the $L_2$ losses for each of the SVBRDF component. The $\mathcal{L}_I$ term represent the $L_2$ loss between the input images 362 and the artificial images rendered via the predictions of SVBDRM decoder network 308 (e.g., $L_2$ may refer to the least square errors loss function).

Referring back to FIG. 1B, the second stage 154 of pipeline 150 includes providing the set of PV depth maps 164 and the set of PV surface-normal maps 168 (both outputs of the first stage 152 of the pipeline 150) to the geometry model generator 146. The geometry model generator 146 "fuses" these per view estimates to construct a coarse 3D geometry model 160 for the object. The geometry model generator 146 may generate 3D points from each pixel in each PV depth map of the set of PV depth maps 164. The 3D points are employed to generate a point cloud from the set of PV depth maps 164. For each point in the point cloud, a corresponding normal vector is estimated from the set of PV surface-normal maps 168. A Poisson reconstruction method employs the 3D points and the surface-normal vectors to reconstruct the coarse 3D geometry model 160. In various embodiments, the geometry model generator 146 may include a Poisson reconstruction engine to perform the Poisson reconstruction method. This coarse geometry model 160 may include outlier points due to inaccuracies in the set of PV depth maps 164. To resolve these inaccuracies, for the coarse geometry model 160, a depth of a spatial octree in the Poisson reconstruction method is set to a value of 7, which results in an effective voxel resolution of 128 (e.g., 7 bits).

Figure 4:
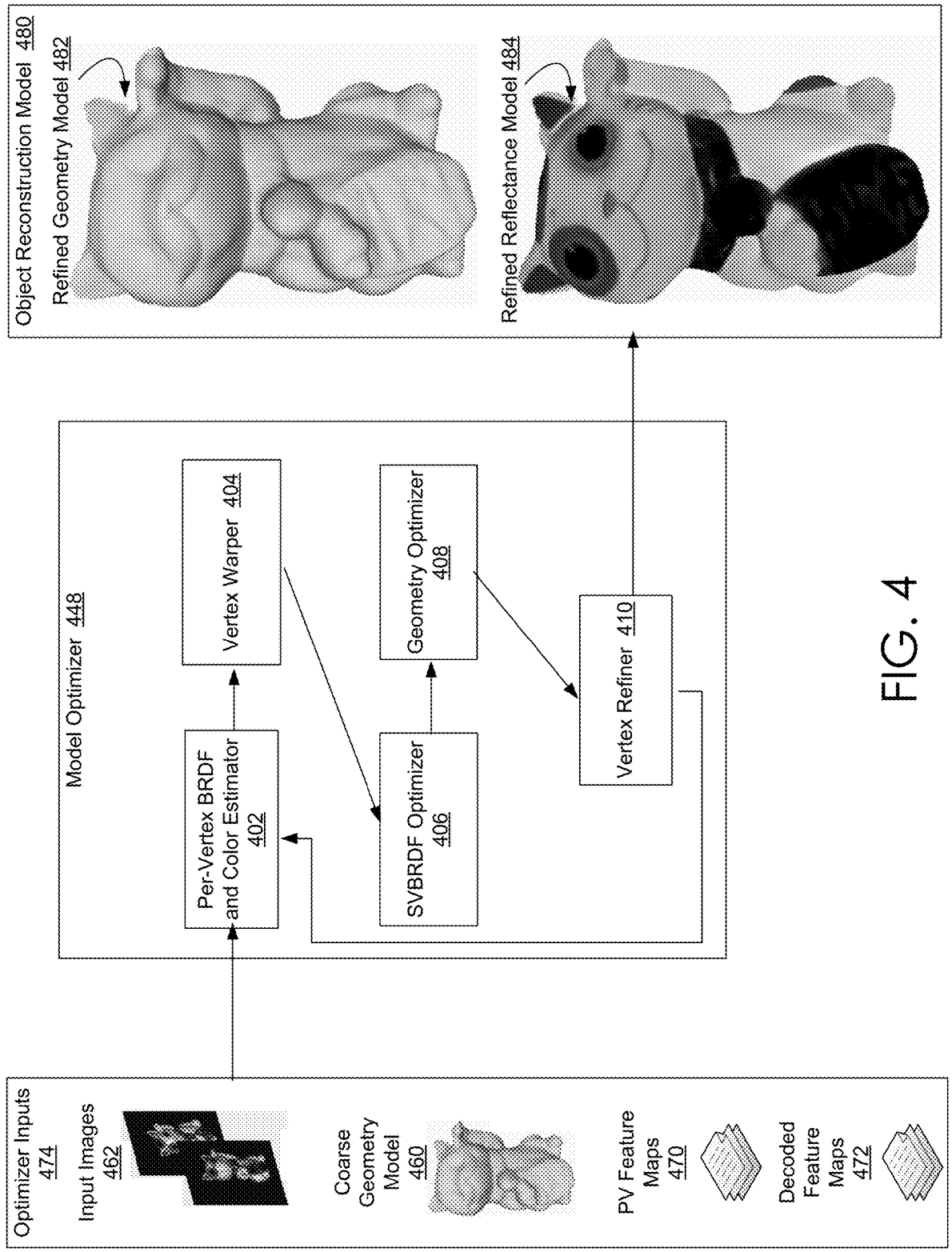
FIG. 4 illustrates a non-limiting embodiment of a model optimizer included in the object reconstruction engine of FIGS. 1A-1B, according to various embodiments presented herein.

FIG. 4 illustrates a non-limiting embodiment of a model optimizer 448 included in the object reconstruction engine 140 of FIGS. 1A-1B, according to various embodiments presented herein. Model optimizer 148 of object reconstruction engine 140 may include features and/or functionalities that are equivalent or similar to model optimizer 448. The optimizer inputs 474 include the set of input images 462, a coarse geometry model 460, the set of PV feature maps 470, and a set of decoded feature maps 472. The set of input images 462 may be similar to the set if input images of FIG. 1B. The coarse geometry model 460 may be similar to the coarse geometry model 160 of FIG. 1B. The set of PV feature maps 470 may be similar to the set of PV feature maps 170. Thus, the set of PV feature maps 470 may include the PV feature maps $f_i^* = \text{max-pool}(\{f_{i,j}\}_{j=1}^6)$, as discussed in conjunction with FIG. 3. Accordingly, the set of PV feature maps 470 may be referred to as a set of PV composite feature maps, or simply a set of composite feature maps. The set of decoded feature maps 472 may be similar to the decoded features maps discussed in conjunction with FIG. 3, e.g., the decoded features map for the ith reference viewpoint may include the 4-tuple: $\mathcal{D}(f_i^*)=(A_i, N_i, R_i, S_i)$. Thus, the set of decoded feature maps 472 may include the set of PV reflectance maps 166 and the set of PV surface-normal maps 168 of FIG. 1B.

The model optimizer 448 may include a per-vertex BRDF and color estimator 402, a vertex warper 404, and SVBRDF optimizer 406, a geometry optimizer 408, and a vertex refiner 410. Per-vertex BRDF and color estimator 402 determines an average BRDF value ($b_k$) for each vertex ($v_k$) of the coarse geometry model 460, where k is the vertices' index. The average BRDF value is a weighted average (across the reference viewpoints) of the BRDF predictions of the SVBRDF decoder network 208 of FIG. 3. In one non-limiting embodiment:

$$b_k = \Sigma_{i=1}^n w_{i,k} \mathcal{D}(p_{k,i}; f_i^*),$$

where $p_{k,i}$ is the corresponding pixel position of the vertex $v_k$ at reference viewpoint i. $\mathcal{D}(p_{k,i}; f_i^*)$ indicates the SVBRDF prediction at $p_{k,i}$ from reference viewpoint I by processing $f_i^*$ via the SVBRDF decoder network 308 ($\mathcal{D}$) and $w_{k,i}$ is the per-vertex blending weights. A "reflected" color at reference view i may be rendered for vertex $v_k$ as:

$$I_i^*(p_{k,i}) = \Theta(b_k, L_i(p_{k,i})),$$

where $L_i(p_{k,i})$ is the lighting directions and the viewing direction of vertex $v_k$ at reference viewpoint i and $\Theta$ is the rendering equation. As a reminder, direct illumination via point lights collocated with the acquisition cameras is assumed, so that shadow effects may be neglected.

Vertex warper 404 projects each vertex onto each reference viewpoint based on the camera calibration. This projection may be referenced as $u_{k,i}$, where k is the vertices index and i is the reference viewpoint index. To refine potential inaccuracies and/or inconsistencies in these vertex projections, a non-rigid warping is applied to each reference viewpoint to improve the alignment of the projections. For each reference viewpoint, a T×T grid with $C=T^2$ control points is employed to generate as smooth warping field over the image plane. In at least one non-limiting embodiment T=11. Translation vectors of control points at reference viewpoint i may be indicated as: $t_{i,c}$. The pixel projection for vertex $v_k$ may be calculated as:

$$p_{k,i} = u_{k,i} + \sum_{c=1}^{C} \theta_c(u_{k,i}) \cdot t_{i,c}$$

where $\theta_c$ is the bilinear weight for control point $t_{i,c}$ at pixel location $u_{k,i}$.

The SVBRDF optimizer 406 is enabled to optimize the PV feature maps 470 ($f_i^*$), per-vertex blending weights $w_{k,i}$, and the per-view warping fields ($t_{i,c}$) to generate the final SVBRDFs. The photometric consistency loss between the rendered colors and the ground truth colors for the K vertices is given by:

$$E_{photo}(f_i^*, w, t) = \frac{1}{n \cdot k} \sum_{k=1}^{K} \sum_{i=1}^{n} \|I_i^*(p_{k,i}) - I_i(p_{k,i})\|_2^2.$$

In some embodiments, the rendered colors may be constrained to be within the range of [0, 1] prior to the calculation of the loss function. To prevent the non-rigid warping from drifting in the optimization process, an $L_2$ regularizer ($E_{warp}$) that penalizes the norm of the translation vectors may be added to the loss function via the following expression:

$$E_{warp}(t) = \frac{1}{n \cdot C} \sum_{i=1}^{n} \sum_{c=1}^{C} \|t_{i,c}\|_2^2,$$

resulting in the combined loss function:

$$E = E_{photo}(f^*, w, t) + \lambda \cdot E_{warp}(t).$$

In various embodiments, the value of $\lambda$ may be set to 100 and the energy function is optimized via an optimization algorithm (e.g., an Adam optimizer). In the embodiments, the learning rate employed by the optimization algorithm may be varied. In at least one embodiment, the learning rate may be set to 0.001. In various embodiments, the SVBRDF optimizer 406 may perform between 400-1000 iterations of this SVBRDF optimization process.

Geometry optimizer 408 is enabled to refine the coarse geometry model 460 by optimizing (or at least refining) the per-vertex surface-normals by re-applying a Poisson reconstruction process (e.g., re-soling the Poisson equation). For this optimization process, the depth of the spatial octree may be increased to 9, resulting in a voxel resolution of 512 discrete levels. Increasing the depth of the spatial octree enables capturing a greater level of detail regarding the object's texture. The updated geometry model may be employed in subsequent iterations of the SVBRDF optimization process. In some embodiments, the geometry model may be updated via geometry optimizer 408 once for every 50 iterations of the SVBRDF optimization process carried out by SVRDF optimizer 406.

Vertex refiner 410 may be enabled to further refine the SVBRDF parameters assigned to each of the vertices ($b_k$) via minimizing (or at least decreasing) the photometric error function above. From the optimization via the SVBRDF optimizer 406, the SVBRDF parameters have sufficiently converged and renderings of the synthetic images are similar to the set of input images. To further refine the parameters, vertex refiner may employ a smaller learning rate (e.g., 0.0005), and perform the optimization of the photometric error function for a small number of iterations (e.g., 40-100 iterations). Upon convergence, the model optimizer 448 outputs the object reconstruction model 480, which includes the refined geometry model 482 and the refined reflectance model 484. The refined geometry model 482 encodes a refined representation of the object's surface geometry. The refined reflectance model 484 encodes a refined representation of one or more surface reflection properties (e.g., diffuse albedo, surface-roughness, specular albedo, and/or surface normals) of the object's surface.

Generalized Processes for Object Reconstruction

Figure 5:
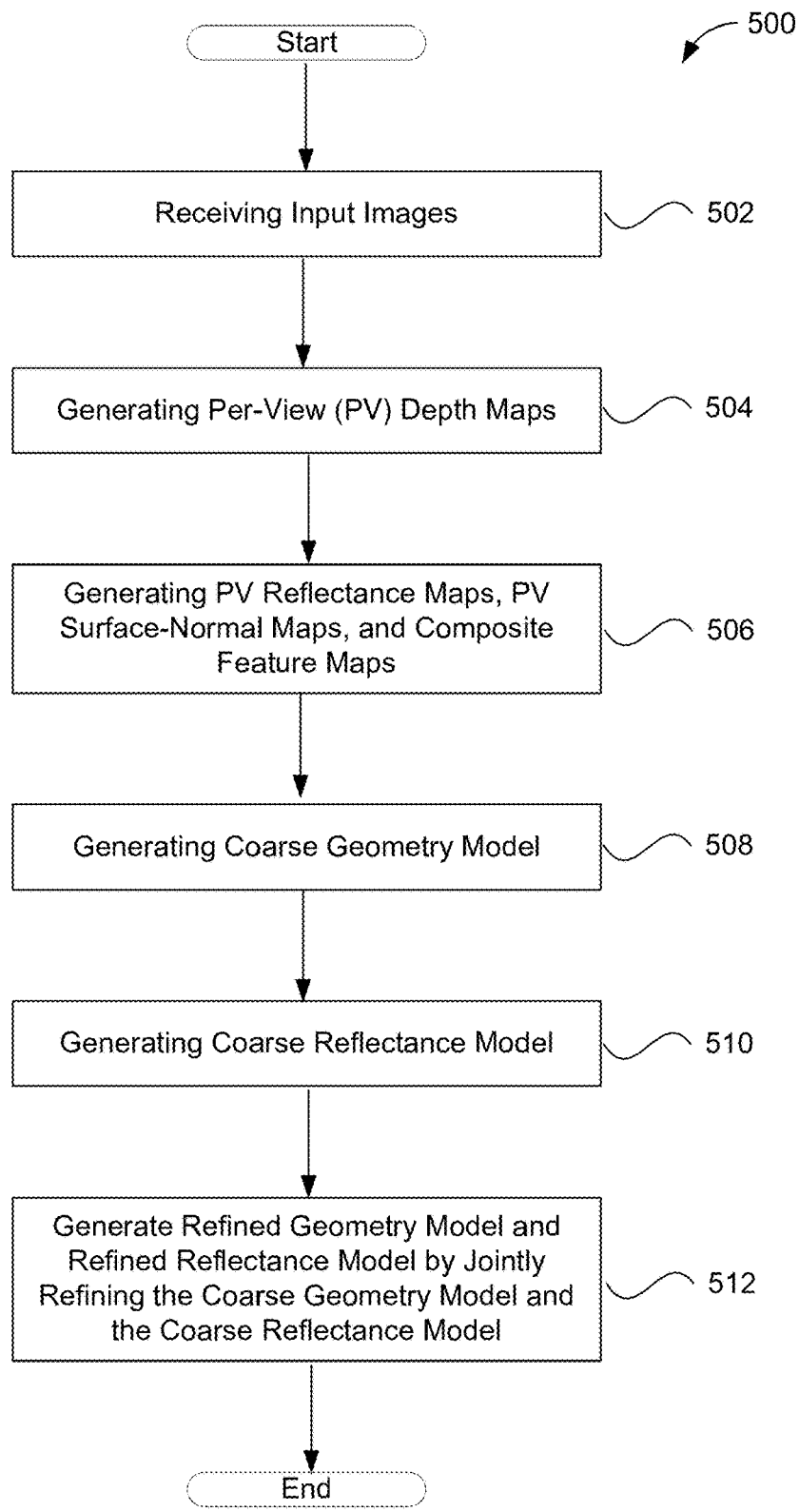
FIG. 5 illustrates one embodiment of a method for generating an object reconstruction model, which is consistent with the various embodiments presented herein.
Figure 6:
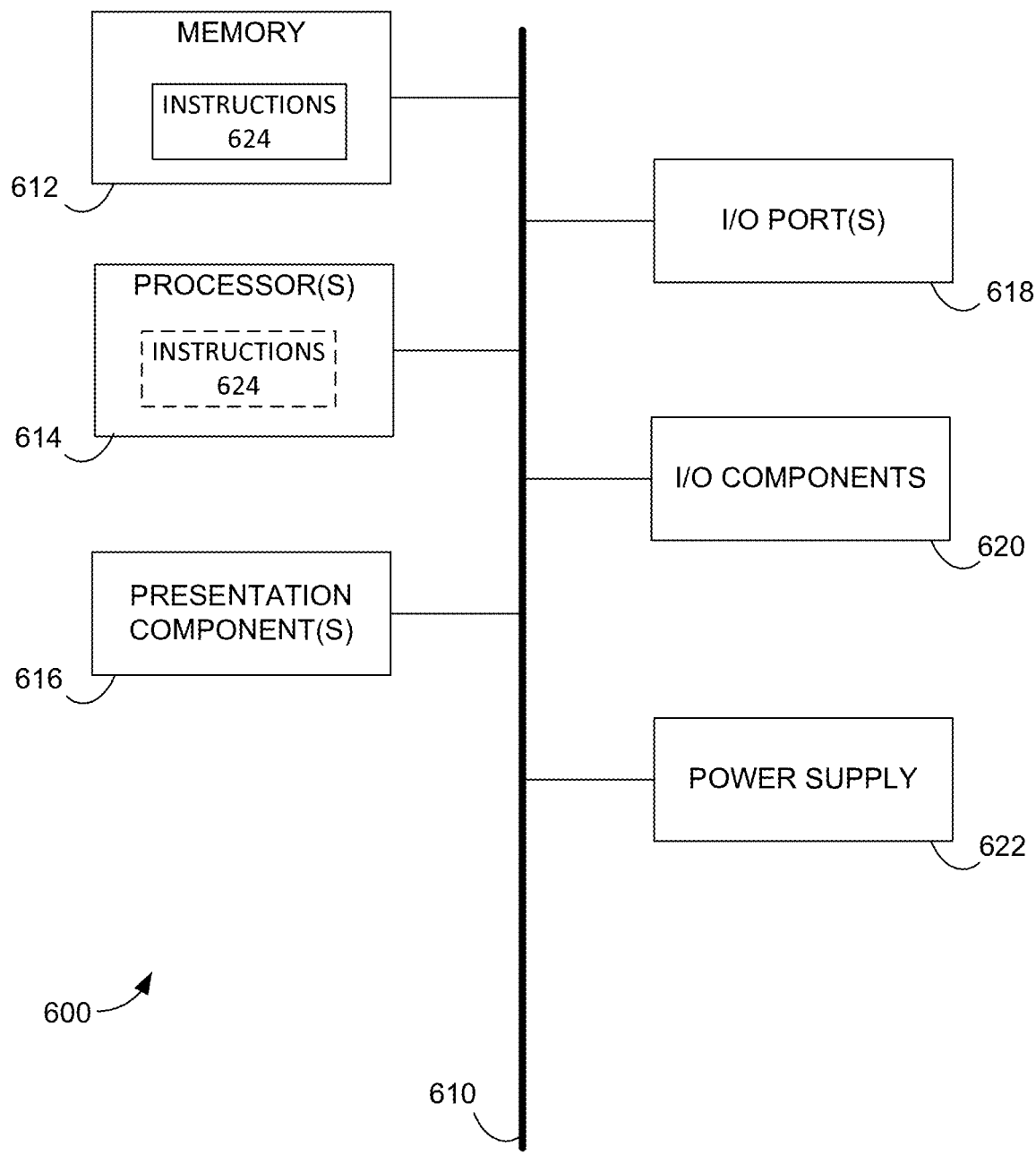
FIG. 6 is a block diagram of an example computing device in which embodiments of the present disclosure may be employed.

Processes 500 of FIG. 5, or portions thereof, may be performed and/or executed by any computing device, such as but not limited to computing devices 102 of FIG. 1A, as well as computing device 600 of FIG. 6. Additionally, an object reconstruction engine, such as but not limited to object reconstruction engine 140 of FIGS. 1A-1B, may perform and/or execute at least portions of process 500.

FIG. 5 illustrates one embodiment of a method for generating an object reconstruction model, which is consistent with the various embodiments presented herein. Process 500 begins, after a start block, at block 502, where a set of input images are received. The input images may have been captured via a multi-camera acquisition system, such as but not limited to image acquisition system 110 of FIG. 1B. Thus, each image of the set of input images may depict a physical three-dimensional (3D) object from separate viewpoints of a set of viewpoints of the multi-camera acquisition system. At block 502, the set of input images may be received at an object reconstruction engine, such as but not limited to object reconstruction engine of FIGS. 1A-1B. The set of input images may be processed by a two-stage pipeline, such as but not limited to pipeline 150 of FIG. 1B, At block 504, a set of per-view (PV) depth maps may be generated based on the set of input images. Each of the PV depth maps may correspond to one of the viewpoints of the set of viewpoints. A multi-view depth module, such as multi-view depth module 242 of FIG. 2 may generate the set of PV depth maps, e.g., the set of PV depth maps 264 of FIG. 2. To generate the set of PV depth maps, the multi-view depth module may generate a set of PV feature maps based on the set of images, e.g., feature maps 232 of FIG. 2. Each feature map of the set of PV feature maps may corresponds to one of the reference viewpoints of the set of reference viewpoints. For each reference viewpoint of the set of reference viewpoints, the multi-view depth module may warp each of these PV feature maps to each of the other reference viewpoints to generate a set of PV warped feature maps, e.g., warped feature maps 234 of FIG. 2. The set of PV depth maps may be generated based on the set of warped feature maps.

At block 506, a set of PV reflectance maps, a set of PV surface-normal maps, and a set of PV composite feature maps may be generated via a multi-reflectance module, such as but not limited to multi-view reflectance module 344 of FIG. 3. The set of input images and the set of PV depth maps may be employed by a multi-view reflectance module, such as but not limited to multi-view reflectance module 344 of FIG. 3, to generate the set of PV reflectance maps, the set of PV surface-normal maps, and the set of PV composite feature maps. Note that the set of PV composite feature maps should not be confused with the sets of feature maps generated by the multi-view depth module at block 504. Each PV reflectance map of the set of PV reflectance maps may correspond to one of the viewpoints of the set of viewpoints. Each PV surface-normal map of the set of PV surface-normal maps may correspond to one of the viewpoints of the set of viewpoints.

More specifically, the multi-view reflectance module may generate an intermediate feature map for each possible pair of viewpoints of the set of reference viewpoints. Each PV composite feature map of the set of PV composite feature maps may correspond to one of the viewpoints of the set of viewpoints and be based on a composite of the set of input images warped to the corresponding reference viewpoint of the set of reference viewpoints. That is, the multi-view reflectance module may generate each composite feature map of the set of composite feature maps by aggregating the intermediate feature maps for each pair of viewpoints that includes a viewpoint of the pair of viewpoints. When generating the set of PV reflectance maps and the set of composite feature maps, the multi-view reflectance module may aggregate the set of PV depth maps across the set of reference viewpoints. In some embodiments, the multi-view reflectance module may generate a set of PV diffuse albedo maps, a set of PV surface-roughness maps, a set of PV specular albedo maps, and the set of PV surface-normal maps based on the set of input images. The set of PV reflectance maps may be based on a combination of the set of PV surface-normal maps, the set of diffuse albedo maps, the set of surface roughness maps, and the set of PV specular albedo maps.

At block 508, a coarse geometry model may be generated based on the set of input images. In some embodiments, the coarse geometry model may be further based on the set of PV depth maps and the set of PV surface-normal maps. The coarse geometry model may encode a coarse representation of a geometry of the surface of the physical object. The coarse geometry model may include a mesh model with a set of vertices. The coarse geometry model may be generated by a geometry model generator, such as but not limited to geometry model generator of FIGS. 1A-1B. More specifically, the geometry model generator may employ the set of PV depth maps to generate a point cloud. The point cloud includes a set of 3D points that approximates the geometry of the surface of the physical object. For each point of the set of 3D points, a normal vector that is substantially orthogonal to the surface of the physical object (e.g., a surface-normal) is determined and/or generated. A Poisson reconstruction process may be employed to generate the coarse geometry model based on the set of 3D points and the normal vector for each point in the set of 3D points.

At block 510, a coarse reflectance model for the physical object may be generated. To generate the coarse reflectance model, the set of PV reflectance maps may be aggregated across the set of reference viewpoints. The coarse reflectance model may encode a coarse representation of one or more reflectance properties (e.g., diffuse albedo, surface-roughness, specular albedo, and/or surface normal) of the surface of the physical object. At block 512, a refined geometry model and a refined reflectance model are generated. The refined geometry model may encode a refined representation of the geometry of the physical object's surface, while the refined reflectance model encodes a refined representation of the one or more reflectance properties of the object's surface. In various embodiments, a model optimizer, such as but not limited to model optimizer 448 of FIG. 4, may iteratively and/or jointly refine the coarse geometry model and the coarse reflectance model to generate the refined geometry model and the refined reflectance model.

In some embodiments, the model optimizer may generate a synthetic image for each image of the set of input images based on the coarse geometry model, the coarse reflection model, and/or the set of PV composite feature maps. A value of an error (or loss) function may be determined based on a comparison of each of the synthetic images with the corresponding image of the set of input images. The coarse geometry model and the coarse reflectance model may be iteratively (and jointly) refined based on a backpropagation of the error function. The refined geometry and reflectance models may be packaged as an object reconstruction model. The object reconstruction model may be employed to render a virtual object (VO) based on the physical object.

Illustrative Computing Device

Having described embodiments of the present invention, an example operating environment in which embodiments of the present invention may be implemented is described below in order to provide a general context for various aspects of the present invention. Referring to FIG. 6, an illustrative operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 6 is merely illustrative of an example computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. Memory 612 may be non-transitory memory. As depicted, memory 612 includes instructions 624. Instructions 624, when executed by processor(s) 614 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 600 includes one or more processors that read data from various entities such as memory 612 or I/O components 620. Presentation component(s) 616 present data indications to a user or other device. Illustrative presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method for a reconstruction of a three-dimensional (3D) physical object, the method comprising:
    receiving a set of images, wherein each image of the set of images depicts the physical object from a separate viewpoint of a set of viewpoints;
    generating, based on the set of image, a set of per-view (PV) reflectance maps, a set of composite feature maps, and a coarse geometry model encoding a coarse representation of a geometry of a surface of the physical object, wherein each PV reflectance map of the set of PV reflectance maps corresponds to one of the viewpoints of the set of viewpoints and each composite feature map of the set of composite feature maps corresponds to one of the viewpoints of the set of viewpoints and is based a composite of the set of images warped to the corresponding viewpoint;
    aggregating the set of PV reflectance maps across the set of viewpoints to generate a coarse reflectance model that includes a set of estimated reflectance parameters for each vertex of the coarse geometry model and for each viewpoint of the set of viewpoints; and
    jointly refining, based on the set of composite feature maps, the coarse geometry model and the coarse reflectance model to generate a refined geometry model and a refined reflectance model, wherein the refined geometry model encodes a refined representation of the geometry and the refined reflectance models encodes a refined representation of the reflectance property, wherein the coarse geometry model and the coarse reflectance model are refined by fusing the set of estimated reflectance parameters for each vertex to reconstruct geometry and reflectance associated with the physical object.

2. The method for claim 1, further comprising:
    generating a set of PV depth maps based on the set of images, wherein each PV depth map of the set of PV depth maps corresponds to one of the viewpoints of the set of viewpoints;
    aggregating the set of PV depth maps across the set of viewpoints to generate the set of PV reflectance maps and the set of composite feature maps; and
    employing the set of PV depth maps to generate the coarse geometry model.

3. The method of claim 2, further comprising:
    generating a set of PV feature maps based on the set of images, wherein each PV feature map of the set of PV feature maps corresponds to one of the viewpoints of the set of viewpoints;
    for each viewpoint of the set of viewpoints, warping each PV feature map to each of the other viewpoints of the set of viewpoints to generate a set of warped feature maps; and
    generating the set of PV depth maps based on the set of warped feature maps.

4. The method of claim 2, further comprising:
    generating a set of PV surface-normal maps based on the set of PV depth maps, wherein each PV surface-normal map of the set of PV surface-normal maps corresponds to one of the viewpoints of the set of viewpoints;
    generating a set of PV diffuse albedo maps based on the set of PV depth maps, wherein each PV diffuse albedo map of the set of PV diffuse albedo maps corresponds to one of the viewpoints of the set of viewpoints;
    generating a set of PV surface-roughness maps based on the set of PV depth maps, wherein each PV surface-roughness map of the set of PV surface-roughness maps corresponds to one of the viewpoints of the set of viewpoints;
    generating a set of PV specular albedo maps based on the set of PV depth maps, wherein each PV specular map of the set of PV specular maps corresponds to one of the viewpoints of the set of viewpoints; and
    generating the set of PV reflectance maps based on a combination of the set of PV surface-normal maps, the set of PV diffuse albedo maps, the set of PV surface-roughness maps, and the set of PV specular albedo maps.

5. The method of claim 2, further comprising:
    generating an intermediate feature map for each pair of viewpoints of the set of viewpoints; and
    generating each composite feature map of the set of composite feature maps by aggregating the intermediate feature maps for each pair of viewpoints that includes a viewpoint of the pair of viewpoints.

6. The method of claim 1, further comprising:
    generating a synthetic image for each image of the set of input images based on the coarse geometry model, the coarse reflectance model, and the set of composite feature maps; and
    determining an error function based on a comparison of each of the synthetic images with the corresponding image of the set of images; and
    refining each of the coarse geometry model and the coarse reflectance model based on the error function.

7. A computing system for a reconstruction of a three-dimensional (3D) physical object, comprising:
    a processor device; and
    a computer-readable storage medium, coupled with the processor device, having instructions stored thereon, which, when executed by the processor device, perform actions comprising:
        steps for generating a set of per-view (PV) reflectance maps based on a set of images, wherein each image of the set of images depicts the physical object from a separate viewpoint of a set of viewpoints and each PV reflectance map of the set of PV reflectance maps corresponds to one of the viewpoints of the set of viewpoints;
        steps for generating a set of composite feature maps, wherein each composite feature map of the set of composite feature maps corresponds to one of the viewpoints of the set of viewpoints and is based on a composite of the set of images warped to the corresponding viewpoint;

steps for jointly refining, based on the set of composite feature maps, a coarse geometry model and a coarse reflectance model to generate a refined geometry model and a refined reflectance model, wherein the refined geometry model encodes a refined representation of the geometry and the refined reflectance models encodes a refined representation of the reflectance property, and wherein the coarse geometry model and the coarse reflectance model are refined by fusing a set of estimated reflectance parameters for each vertex to reconstruct geometry and reflectance.

8. The computing system of claim 7, wherein the actions further comprise:

steps for generating a set of PV depth maps based on the set of images, wherein each PV depth map of the set of PV depth maps corresponds to one of the viewpoints of the set of viewpoints;

steps for aggregating the set of PV depth maps across the set of viewpoints to generate the set of PV reflectance maps and the set of composite feature maps; and steps for employing the set of PV depth maps to generate the coarse geometry model.

9. The computing system of claim 8, wherein the actions further comprise:

steps for generating a set of PV feature maps based on the set of images, wherein each PV feature maps of the set of PV feature maps corresponds to one of the viewpoints of the set of viewpoints;

for each viewpoint of the set of viewpoints, steps for warping each PV feature map to each of the other viewpoints of the set of viewpoints to generate a set of warped feature maps; and steps for generating the set of PV depth maps based on the set of warped feature maps.

10. The computing system of claim 8, wherein the actions further comprise:

steps for generating a set of PV surface-normal maps based on the set of PV depth maps, wherein each PV surface-normal map of the set of PV surface-normal maps corresponds to one of the viewpoints of the set of viewpoints;

steps for generating a set of PV diffuse albedo maps based on the set of PV depth maps, wherein each PV diffuse albedo map of the set of PV diffuse albedo maps corresponds to one of the viewpoints of the set of viewpoints;

steps for generating a set of PV surface-roughness maps based on the set of PV depth maps, wherein each PV surface-roughness map of the set of PV surface-roughness maps corresponds to one of the viewpoints of the set of viewpoints;

steps for generating a set of PV specular albedo maps based on the set of PV depth maps, wherein each PV specular map of the set of PV specular maps corresponds to one of the viewpoints of the set of viewpoints; and steps for generating the set of PV reflectance maps based on a combination of the set of PV surface-normal maps, the set of PV diffuse albedo maps, the set of PV surface-roughness maps, and the set of PV specular albedo maps.

11. The computing system of claim 7, wherein the actions further comprise:

steps for generating an intermediate feature map for each pair of viewpoints of the set of viewpoints; and steps for generating each composite feature map of the set of composite feature maps by aggregating the intermediate feature maps for each pair of viewpoints that includes a viewpoint of the pair of viewpoints.

12. The computing system of claim 7, wherein the actions further comprise:

steps for generating a synthetic image for each image of the set of input images based on the coarse geometry model, the coarse reflectance model, and the set of composite feature maps; and steps for determining an error function based on a comparison of each of the synthetic images with the corresponding image of the set of images; and steps for refining each of the coarse geometry model and the coarse reflectance model based on the error function.

13. The computing system of claim 7, wherein the actions further comprise:

steps for generating a set of PV depth maps based on the set of images, wherein each PV depth map of the set of PV depth maps corresponds to one of the viewpoints of the set of viewpoints;

steps for generating a set of PV surface-normal maps based on the set of PV depth maps, wherein each PV surface-normal map of the set of PV surface-normal maps corresponds to one of the viewpoints of the set of viewpoints;

steps for employing the set of PV depth maps to generate a point cloud, wherein the point cloud includes a set of 3D points that approximates the geometry of the surface of the physical object;

for each point of the set of 3D points, steps for determining a normal vector that is substantially orthogonal to the surface of the physical object; and steps for employing a Poisson reconstruction process to generated the coarse geometry model based on the set of 3D points and the normal vector for each point in the set of 3D points.

14. A non-transitory computer-readable storage medium having instructions stored thereon for a reconstruction of a three-dimensional (3D) physical object, which, when executed by a processor of a computing device cause the computing device to perform actions comprising:

generating a set of per-view (PV) reflectance maps based on a set of images, wherein each image of the set of images depicts the physical object from a separate viewpoint of a set of viewpoints and each PV reflectance map of the set of PV reflectance maps corresponds to one of the viewpoints of the set of viewpoints;

generating a set of composite feature maps, wherein each composite feature map of the set of composite feature maps corresponds to one of the viewpoints of the set of viewpoints and is based on a composite of the set of images warped to the corresponding viewpoint;

jointly refining, based on the set of composite feature maps, a coarse geometry model and a coarse reflectance model to generate a refined geometry model and a refined reflectance model, wherein the refined geometry model encodes a refined representation of the geometry and the refined reflectance models encodes a refined representation of the reflectance property, and wherein the coarse geometry model and the coarse reflectance model are refined by fusing a set of estimated reflectance parameters for each vertex to reconstruct geometry and reflectance.

15. The non-transitory computer-readable storage medium of claim 14, wherein the actions further comprise:
generating a set of PV depth maps based on the set of images, wherein each PV depth map of the set of PV depth maps corresponds to one of the viewpoints of the set of viewpoints;
aggregating the set of PV depth maps across the set of viewpoints to generate the set of PV reflectance maps and the set of composite feature maps; and
employing the set of PV depth maps to generate the coarse geometry model.

16. The non-transitory computer-readable storage medium of claim 15, wherein the actions further comprise:
generating a set of PV feature maps based on the set of images, wherein each PV feature maps of the set of PV feature maps corresponds to one of the viewpoints of the set of viewpoints;
for each viewpoint of the set of viewpoints, warping each PV feature map to each of the other viewpoints of the set of viewpoints to generate a set of warped feature maps; and
generating the set of PV depth maps based on the set of warped feature maps.

17. The non-transitory computer-readable storage medium of claim 15, wherein the actions further comprise:
generating a set of PV surface-normal maps based on the set of PV depth maps, wherein each PV surface-normal map of the set of PV surface-normal maps corresponds to one of the viewpoints of the set of viewpoints;
generating a set of PV diffuse albedo maps based on the set of PV depth maps, wherein each PV diffuse albedo map of the set of PV diffuse albedo maps corresponds to one of the viewpoints of the set of viewpoints;
generating a set of PV surface-roughness maps based on the set of PV depth maps, wherein each PV surface-roughness map of the set of PV surface-roughness maps corresponds to one of the viewpoints of the set of viewpoints;
generating a set of PV specular albedo maps based on the set of PV depth maps, wherein each PV specular map of the set of PV specular maps corresponds to one of the viewpoints of the set of viewpoints; and
generating the set of PV reflectance maps based on a combination of the set of PV surface-normal maps, the set of PV diffuse albedo maps, the set of PV surface-roughness maps, and the set of PV specular albedo maps.

18. The non-transitory computer-readable storage medium of claim 14, wherein the actions further comprise:
generating an intermediate feature map for each pair of viewpoints of the set of viewpoints; and
generating each composite feature map of the set of composite feature maps by aggregating the intermediate feature maps for each pair of viewpoints that includes a viewpoint of the pair of viewpoints.

19. The non-transitory computer-readable storage medium of claim 14, wherein the actions further comprise:
generating a synthetic image for each image of the set of input images based on the coarse geometry model, the coarse reflectance model, and the set of composite feature maps;
determining an error function based on a comparison of each of the synthetic images with the corresponding image of the set of images; and
refining each of the coarse geometry model and the coarse reflectance model based on the error function.

20. The non-transitory computer-readable storage medium of claim 14, wherein the actions further comprise:
generating a set of PV depth maps based on the set of images, wherein each PV depth map of the set of PV depth maps corresponds to one of the viewpoints of the set of viewpoints;
generating a set of PV surface-normal maps based on the set of PV depth maps, wherein each PV surface-normal map of the set of PV surface-normal maps corresponds to one of the viewpoints of the set of viewpoints;
employing the set of PV depth maps to generate a point cloud, wherein the point cloud includes a set of 3D points that approximates the geometry of the surface of the physical object;
for each point of the set of 3D points, determining a normal vector that is substantially orthogonal to the surface of the physical object; and
employing a Poisson reconstruction process to generated the coarse geometry model based on the set of 3D points and the normal vector for each point in the set of 3D points.

* * * * *

UNITED STATES PATENT AND TRADEMARK OFFICE
CERTIFICATE OF CORRECTION

| | | |
|---|---|---|
| PATENT NO. | : 11,669,986 B2 | Page 1 of 1 |
| APPLICATION NO. | : 17/233122 | |
| DATED | : June 6, 2023 | |
| INVENTOR(S) | : Sai Bi et al. | |

It is certified that error appears in the above-identified patent and that said Letters Patent is hereby corrected as shown below:

In the Claims

Column 25, Line 39 In Claim 1, after "based" insert -- on --.

Column 25, Line 58 In Claim 2, delete "for" and insert -- of --.

Column 28, Line 43 In Claim 14, delete "Anon-transitory" and insert -- A non-transitory --.

Signed and Sealed this
Twenty-fourth Day of October, 2023

*Katherine Kelly Vidal*

Katherine Kelly Vidal
*Director of the United States Patent and Trademark Office*